United States Patent
Sieber et al.

(10) Patent No.: US 11,691,522 B2
(45) Date of Patent: *Jul. 4, 2023

(54) EXTENDED-RANGE POSITIONING SYSTEM BASED ON FOREIGN-OBJECT DETECTION

(71) Applicant: WiTricity Corporation, Watertown, MA (US)

(72) Inventors: Lukas Sieber, Olten (CH); Andreas Daetwyler, Muhen (CH); Marcel Fischer, Boniswil (CH)

(73) Assignee: WiTricity Corporation, Watertown, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/497,730

(22) Filed: Oct. 8, 2021

(65) Prior Publication Data

US 2022/0041072 A1 Feb. 10, 2022

Related U.S. Application Data

(63) Continuation of application No. 16/284,959, filed on Feb. 25, 2019, now Pat. No. 11,142,084.

(Continued)

(51) Int. Cl.
  B60L 53/124 (2019.01)
  H02J 50/12 (2016.01)
  (Continued)

(52) U.S. Cl.
  CPC .............. B60L 53/124 (2019.02); B60L 53/66 (2019.02); H01F 27/36 (2013.01); H01F 38/14 (2013.01);
  (Continued)

(58) Field of Classification Search
  CPC ........ B60L 53/124; B60L 53/66; B60L 53/36; B60L 53/38; H01F 27/36; H01F 38/14;
  (Continued)

(56) References Cited

U.S. PATENT DOCUMENTS 7,948,208 B2 * 5/2011 Partovi ................. H02J 7/0013
  320/108
9,631,950 B2 * 4/2017 Raedy ..................... H02J 50/90
(Continued)

FOREIGN PATENT DOCUMENTS

EP       2942228      11/2015
WO    2020027909       2/2020

OTHER PUBLICATIONS

"International Preliminary Report on Patentability", Application No. PCT/US2019/034910, dated Feb. 2, 2021, 13 pages.

(Continued)

*Primary Examiner* — Jared Fureman
*Assistant Examiner* — Michael J Warmflash
(74) *Attorney, Agent, or Firm* — Colby Nipper PLLC

(57) ABSTRACT

Systems and methods are described for an extended-range positioning system based on foreign-object detection (FOD). In particular, a power-transfer apparatus is disclosed that includes a coil and a foreign-object-detection (FOD) system. The coil is configured to generate a magnetic field based on an electric current running through the coil for transferring power to a receiver device. the FOD system includes a plurality of FOD sense loops, FOD circuitry, and active-beacon receive circuitry. The FOD sense loops detect metal objects within the magnetic field based on changes to an electrical characteristic(s) of one or more of the FOD sense loops. The FOD circuitry processes a modulation pattern of the electrical characteristic(s) of the one or more FOD sense loops and provides first positioning information. The active-beacon receive circuitry processes induced voltage in at least two sense loops to provide second positioning information.

27 Claims, 13 Drawing Sheets

Related U.S. Application Data

(60) Provisional application No. 62/712,884, filed on Jul. 31, 2018.

(51) Int. Cl.

| | | |
|---|---|---|
| *H01F 38/14* | (2006.01) | |
| *H02J 50/90* | (2016.01) | |
| *B60L 53/66* | (2019.01) | |
| *H02J 50/60* | (2016.01) | |
| *H01F 27/36* | (2006.01) | |

(52) U.S. Cl.
CPC .............. *H02J 50/12* (2016.02); *H02J 50/60* (2016.02); *H02J 50/90* (2016.02)

(58) Field of Classification Search
CPC ......... H01F 27/402; H02J 50/12; H02J 50/60; H02J 50/90; H02J 50/005; H02J 2310/48; H02J 50/70; Y02T 10/70; Y02T 10/7072; Y02T 90/12; Y02T 90/14; Y02T 90/16; G01V 3/104
See application file for complete search history.

(56) References Cited

U.S. PATENT DOCUMENTS

| | | | | |
|---|---|---|---|---|
| 10,063,110 | B2* | 8/2018 | Meichle | H02J 50/80 |
| 10,324,215 | B2* | 6/2019 | Widmer | H02J 7/00034 |
| 10,411,524 | B2* | 9/2019 | Widmer | B60L 53/38 |
| 10,461,587 | B2* | 10/2019 | Sieber | B60L 53/124 |
| 10,944,300 | B2* | 3/2021 | Sieber | H02J 50/80 |
| 11,142,084 | B2 | 10/2021 | Sieber et al. | |
| 2010/0315038 | A1* | 12/2010 | Terao | H02J 50/60 |
| | | | | 320/108 |
| 2012/0007437 | A1* | 1/2012 | Fells | H01F 38/14 |
| | | | | 307/104 |
| 2014/0035526 | A1 | 2/2014 | Tripathi et al. | |
| 2014/0145514 | A1* | 5/2014 | Konno | B60L 58/12 |
| | | | | 307/104 |
| 2015/0137801 | A1* | 5/2015 | Raedy | H02J 7/00034 |
| | | | | 324/207.15 |
| 2016/0336818 | A1 | 11/2016 | Garcia Briz et al. | |
| 2018/0083349 | A1* | 3/2018 | Sieber | B60L 53/124 |
| 2019/0356178 | A1* | 11/2019 | Widmer | B60L 53/38 |
| 2019/0363588 | A1* | 11/2019 | Daetwyler | H02J 50/60 |
| 2020/0039368 | A1* | 2/2020 | Sieber | B60L 53/124 |

OTHER PUBLICATIONS

"International Search Report and Written Opinion", PCT Application No. PCT/US2019/034910, dated Nov. 7, 2019, 21 pages.
"Invitation to Pay Additional Fees", PCT Application No. PCT/US2019/034910, dated Sep. 16, 2019, 13 pages.
"Notice of Allowance", U.S. Appl. No. 16/284,959, dated Jun. 10, 2021, 9 pages.
"Restriction Requirement", U.S. Appl. No. 16/284,959, dated Jan. 21, 2021, 7 pages.
"Foreign Office Action", JP Application No. 2021-505425, dated Mar. 6, 2023, 13 pages.

* cited by examiner

EXTENDED-RANGE POSITIONING SYSTEM BASED ON FOREIGN-OBJECT DETECTION

RELATED APPLICATIONS

This application is a continuation of and claims priority to U.S. Utility application Ser. No. 16/284,959 filed Feb. 25, 2019 which in turn claims priority to U.S. Provisional Patent Application 62/712,884 filed Jul. 31, 2018 the disclosures of which are incorporated by reference herein in their entireties.

FIELD

The present disclosure relates generally to wireless power transfer, and more specifically to wireless electric vehicle charging (WEVC) systems. In particular, this disclosure relates to providing position information in an extended range around a base power-transfer system.

BACKGROUND

Wireless power-transfer systems may differ in many aspects including circuit topologies, magnetics layout, and power-transmission capabilities or requirements. The amount of power transferred and the efficiency of the power transfer between components of a wireless power-transfer system may depend on the alignment between a transmitter of the wireless power-transfer system and a receiver of an electric vehicle. Because of this, some wireless power-transfer systems benefit from alignment systems.

SUMMARY

Systems and methods are described for an extended-range positioning system based on using foreign-object-detection (FOD) hardware and processing circuitry. In particular, circuitry is implemented to extend a beacon positioning system, which uses a passive beacon to provide accurate short-range position information, with an active-beacon-positioning system that provides position information in an extended range around a base power-transfer system. The two systems complement each other because a passive beacon system functions accurately when positioned over the base power-transfer system, whereas the active-beacon-positioning system functions more accurately in the vicinity of the base power-transfer system but not directly over the base power-transfer system. Therefore, with the capabilities of the two systems combined, a guided vehicle approach is enabled with high accuracy from approximately 2.0 meters to zero meters or more.

In an example aspect, a power-transfer apparatus is disclosed. The power-transfer apparatus includes a coil configured to generate a magnetic field based on an electric current running through the coil. The power-transfer apparatus also includes a foreign-object-detection (FOD) system that includes a plurality of FOD sense loops, FOD circuitry, and active-beacon circuitry. The FOD sense loops are configured to detect an object within the magnetic field generated by the coil based on changes to one or more electrical characteristics of one or more FOD sense loops of the plurality of FOD sense loops. The FOD circuitry is configured to process a modulation pattern of the one or more electrical characteristics of the one or more FOD sense loops and provide first positioning information corresponding to a passive beacon at an electric vehicle. The active-beacon circuitry is configured to process induced voltage in at least two sense loops to provide second positioning information corresponding to an active beacon at the electric vehicle. In an aspect, the two sense loops are also FOD sense loops. Alternatively, dedicated sense loops integrated in addition to the FOD sense loops can be used to measure induced voltage. In some cases, the FOD circuitry can process induced voltage of a single sense loop to provide the second positioning information, such as radius information, corresponding to the active beacon at the electric vehicle.

In an example aspect, a wireless-power receiver apparatus is disclosed. The wireless-power receiver apparatus includes a passive-beacon circuit and an active-beacon circuit. The passive-beacon circuit includes a beacon loop configured to generate a modulation, based on a modulated impedance state of the passive-beacon circuit, that is detectable by a FOD system at a wireless-power transmitter apparatus for determining first positioning information of the beacon loop relative to the FOD system. The active-beacon circuit includes a signal generator circuit configured to couple onto a portion of a tuning capacitor of a receive coil of an electric vehicle. The active-beacon circuit is configured to inject an electric current into the receive coil to cause the receive coil to act as a beacon transmission antenna that generates an active beacon signal that is detectable by the FOD system for determining second positioning information of an electric vehicle relative to the FOD system.

In an example aspect, a method for detecting presence and position of an active beacon is disclosed. The method includes detecting an induced voltage in two or more FOD sense loops of a FOD system in response to a magnetic field generated by a beacon transmitter in a receiver device. The method further includes measuring a magnitude and phase of the induced voltage at each of the two or more FOD sense loops. The method also includes estimating a distance between the active beacon and a target position on the FOD system based on the magnitudes measured at the two or more FOD sense loops. In addition, the method includes determining a lateral offset of the receiver device relative to the FOD system based on a comparison between the magnitudes of the two or more FOD sense loops. The method further includes generating position information based on the estimated distance and the lateral offset, the position information usable to align the receiver device with a base power-transfer apparatus for transferring power to an electric device connected to the receiver device.

In an example aspect, a base power-transfer apparatus is disclosed. The base power-transfer apparatus includes a coil and a foreign-object-detection system. The coil is configured to generate a magnetic field based on an electric current running through the inductive power-transfer coil for transferring power to an electric vehicle. The foreign-object-detection system includes a plurality of foreign-object-detection sense loops distributed over an area spanning the inductive-power transfer coil. The foreign-object-detection system also includes a first processing circuit selectively electrically connected to each of the plurality of foreign-object-detection sense loops. In addition, the foreign-object-detection system includes a second processing circuit selectively electrically connected to at least one of the plurality of foreign-object-detection sense loops. In an aspect, the second processing circuit comprises a capacitor electrically connected in parallel to the at least one of the plurality of foreign-object-detection sense loops when the second processing circuit is electrically connected to the at least one of the plurality of foreign-object-detection sense loops.

In an example aspect, a foreign-object-detection system (FOD) is disclosed. The FOD system includes a means for detecting an object within the magnetic field generated by the IPT coil based on changes to one or more electrical characteristics of one or more FOD sense loops of the plurality of FOD sense loops. The FOD system also includes a means for processing a modulation pattern of the one or more electrical characteristics of the one or more FOD sense loops to provide first positioning information corresponding to a passive beacon at an electric vehicle when the passive beacon is located above the base power-transfer system. The FOD system further includes a means for processing induced voltage in at least two sense loops of the plurality of FOD sense loops to provide second positioning information corresponding to an active beacon at the electric vehicle when the electric vehicle is located in an area around the base power-transfer system.

DETAILED DESCRIPTION

Figure 1:
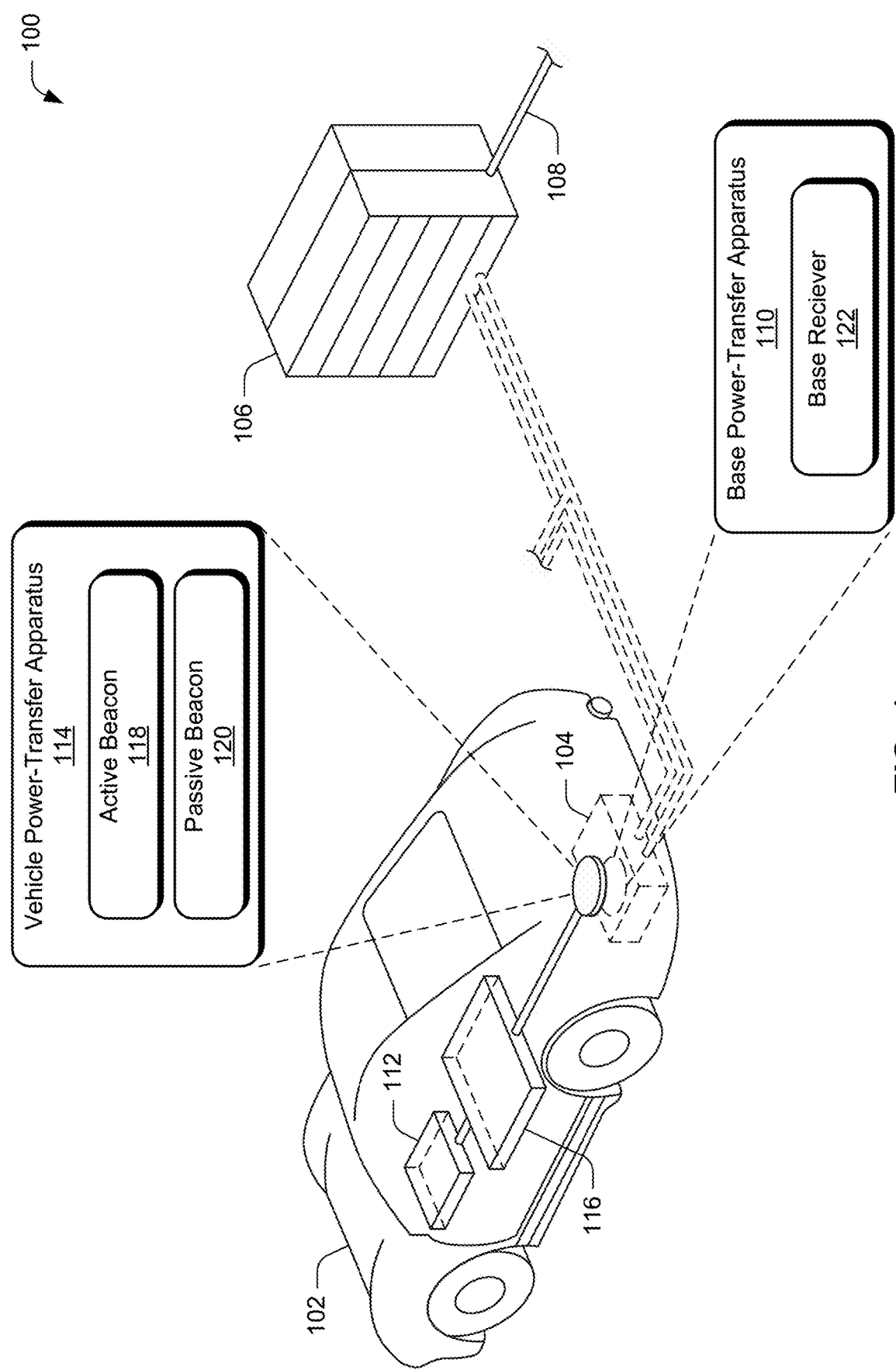
FIG. 1 is a functional block diagram of an example wireless power-transfer system.

Misalignment between a vehicle power-transfer system and a base power-transfer system can negatively affect efficiency of power transfer to the electric vehicle.

An extended-range positioning system based on a foreign-object-detection (FOD) system is disclosed herein. In aspects, a passive-beacon-positioning system that is configured for short-range positioning is combined with a longer-range active-beacon-positioning system to provide position information in an extended range around a base power-transfer system.

The active-beacon-positioning system uses a beacon transmission antenna in a vehicle power-transfer system to emit a beacon signal. An active-beacon circuit injects an electric current into an inductive power-transfer (IPT) coil of an electric vehicle to cause the IPT coil to act as the beacon transmission antenna. Alternatively, a separate coil can be added to the vehicle power-transfer system to create the active beacon in response to current injected therein. A quasi-static magnetic field is generated around the beacon transmission antenna, which can then be received by an appropriate receiver and used to obtain position information. The receiver can be the FOD system built into the base power-transfer system, or a dedicated circuit. The receiver can include a parallel-tuned circuit for detecting the beacon signal. In aspects, the receiver can measure induced voltage in at least two spaced-apart FOD loops, such as two corner FOD loops of a rectangular FOD loop array. As the electric vehicle approaches the FOD system in the base power-transfer, the receiver can determine positioning information, such as a distance from a target position over the FOD loop array to the active beacon as well as a lateral offset of the active beacon from a centerline of the FOD loop array. By using the FOD system, existing hardware components may be reused, resulting in a reduction of cost and complexity of the overall WEVC system.

The passive beacon system uses a passive beacon in the vehicle power-transfer system to determine the position of the vehicle power-transfer system relative to the base power-transfer system. In at least some aspects, position information can be computed in an area covered by the FOD system, such as an area corresponding to the base power-transfer system. The passive beacon system uses a resonant beacon loop controlled by a switch (metal-oxide-semiconductor field-effect transistor (MOSFET)) to create a passive beacon signal that can be detected based on FOD by inducing an impedance change or admittance change in sense loops of the FOD system. In an aspect, the beacon loop is not driven with a signal, but the switch is used to modulate the beacon loop resonance to create a modulation observed as varying electrical characteristics (e.g., impedance or admittance characteristics) at sense loops of the FOD system. The modulation alters the beacon loop impedance between at least two impedance states to present two different responses at the FOD sense loops at a frequency (e.g., acting as if alternating between two different metal objects with different characteristics). The two states at the frequency allows the FOD system to characterize/recognize the object as the beacon loop. Detecting the beacon loop allows for determining positioning of the beacon loop with respect to the FOD sense loops. In one example, a passive-beacon circuit includes a beacon loop electrically connected in series to a capacitor to form a resonant circuit that is electrically connected to a transistor, which is configured to modulate the impedance state of the passive-beacon circuit in response to a modulation control signal. Accordingly, when the beacon loop is resonating due to FOD fields generated at a coil (e.g., sense loop), the beacon loop can be detected as a special metal object because of the modulation, and position information can be determined based on which of the FOD sense loops detect the passive beacon and the amount of change in the electrical characteristics detected by those FOD sense loops. While applicable to vehicles, the techniques described herein may also be applicable to other wireless power-transfer systems for other applications, such as consumer electronics, drones, and the like.

FIG. 1 illustrates an example wireless electric vehicle charging (WEVC) system 100, which enables the delivery of power to an electric vehicle 102 The electric vehicle 102 can be charged or powered in whole or in part using the WEVC system 100. Transmit circuitry 106 may be part of the transmitter 104. The transmit circuitry 106 may be coupled to a power backbone 108 (e.g., a power grid). The transmit circuitry 106 is configured to receive power from the power backbone 108. The transmitter 104 (which may also be referred to as a power transmitting circuit) may be coupled to the transmit circuitry 106 and configured to receive power from the transmit circuitry 106. The transmitter 104 may include at least one base power-transfer apparatus 110 (e.g., a coil) coupled to the transmit circuitry 106. As shown in FIG. 1, the transmitter 104 may be located at or below the ground (as represented with dotted lines).

The electric vehicle 102 may include a battery unit 112, a vehicle power-transfer apparatus 114, and an electric vehicle battery-charging system 116. The electric vehicle battery-charging system 116 and the vehicle power-transfer apparatus 114 constitute the electric vehicle wireless charging system. The vehicle power-transfer apparatus 114 may interact with the base power-transfer apparatus 110, for example, based on resonant inductive coupling via a region of a magnetic field generated by the base power-transfer apparatus 110. In some exemplary implementations, the vehicle power-transfer apparatus 114 may receive power when the vehicle power-transfer apparatus 114 is located in the magnetic field produced by the base power-transfer apparatus 110.

The vehicle power-transfer apparatus 114 (also referred to herein as a "wireless-power receiver apparatus) may be positioned within a charging area of the base power-transfer apparatus 110 (also referred to herein as a "wireless-power transmitter apparatus) to receive power. The electric vehicle battery-charging system 116 is configured to receive power from the vehicle power-transfer apparatus 114. The electric vehicle battery-charging system 116 is configured to process the power received by the vehicle power-transfer apparatus 114 to power or charge the battery unit 112 or other load, such as an electric motor or other ancillary in the electric vehicle 102 while it is stationary, including a heating system or air conditioning system.

The vehicle power-transfer apparatus 114 is illustrated as including an active beacon 118 and a passive beacon 120. In aspects, the active beacon 118 is configured to enable guidance and positioning of the electric vehicle 102 as the electric vehicle 102 approaches the base power-transfer apparatus 110. The active beacon 118 is configured to emit a beacon signal that creates a detectable signal, such as an induced voltage, in sense loops of a base receiver 122 implemented at the base power-transfer apparatus 110. The beacon signal is used to obtain position information of the electric vehicle 102 relative to the base power-transfer apparatus 110 as the electric vehicle 102 approaches the base receiver 122. In some aspects, the passive beacon and the active beacon can share certain circuitry. For example, in some implementations a passive beacon loop can be connected to circuitry that drives the passive beacon loop with a signal that creates an active beacon signal. In other implementations, as will be described in further detail herein, the IPT coil of the vehicle power-transfer apparatus acts as the active beacon component to emit the active beacon. In yet other implementations, the IPT coil at the vehicle power-transfer apparatus can act as the passive beacon loop and be modulated in and out of resonance in a way that is detectable by the FOD system. The base receiver 122 can be an FOD system built into the base power-transfer apparatus 110, or a dedicated circuit.

In aspects, the passive beacon 120 is configured to enable guidance and positioning of the electric vehicle 102 once the passive beacon 120 is located directly above sense loops of the base receiver 122 implemented at the base power-transfer apparatus 110. The passive beacon 120 is configured to create detectable changes, such as impedance changes, in the sense loops of the base receiver 122. Further details of this and other aspects are described below with reference to FIGS. 2-10.

Figure 2:
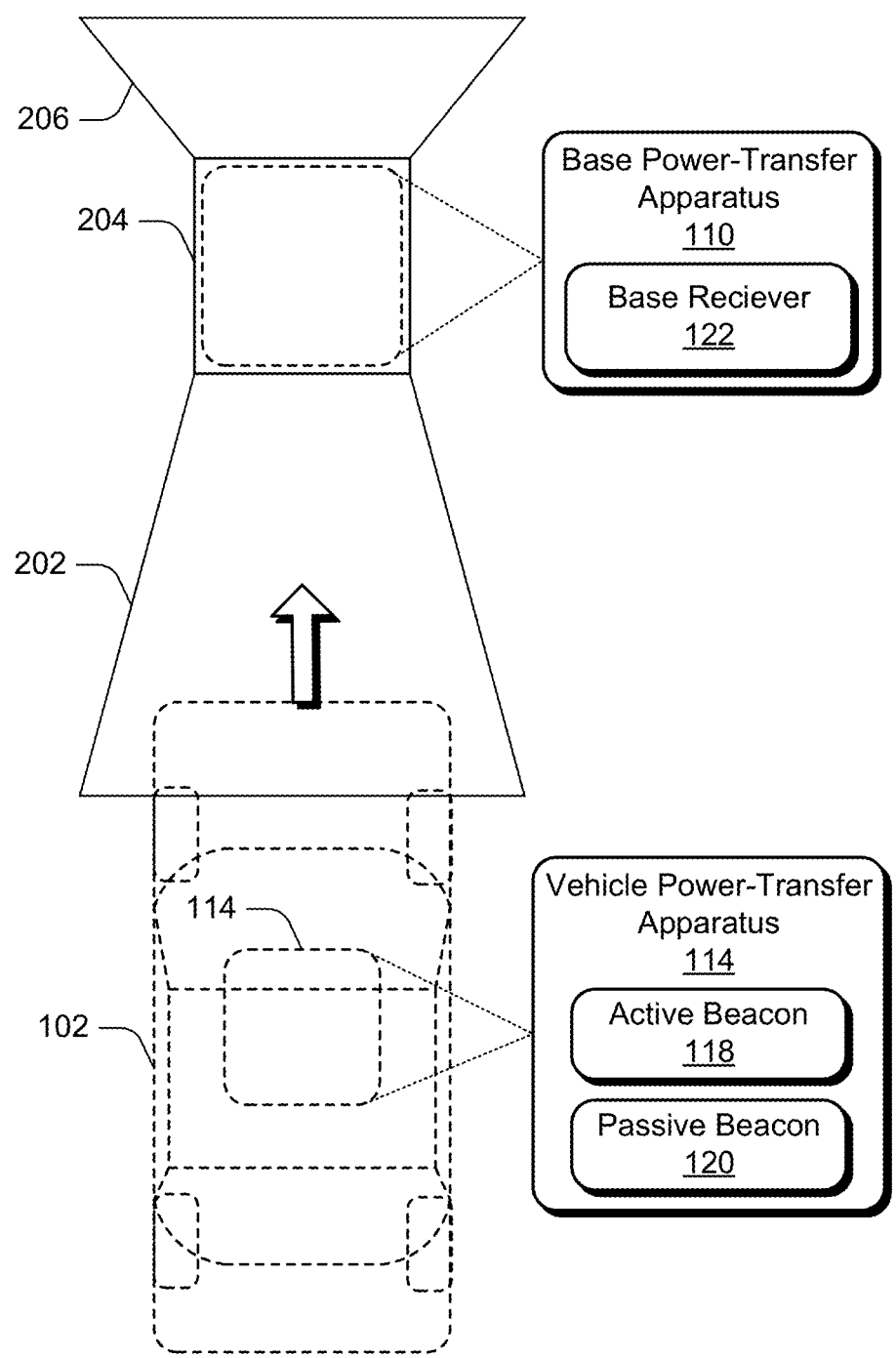
FIG. 2 illustrates an example implementation of regions in which active and passive beacons are used for positioning of an electric vehicle.

FIG. 2 illustrates an overhead view of an example implementation 200 of regions in which active and passive beacons are used for positioning of an electric vehicle. As the electric vehicle 102 approaches the base power-transfer apparatus 110, the vehicle 102 enters an approach sector 202. The approach sector 202 represents an area in which the base receiver 122 of the base power-transfer apparatus 110 can detect the active beacon 118 in the vehicle power-transfer apparatus 114 and determine position information of the electric vehicle 102 relative to the base power-transfer apparatus 110. While the electric vehicle is in the approach sector 202, the passive beacon 120 may be modulated to enable detection by the base receiver 122. However, the base receiver 122 may use the position information obtained from the active beacon 118 in the approach sector 202 for more accurate position information than that obtained from the passive beacon 120.

In an example, when the electric vehicle 102 enters a target sector 204, the base receiver 122 may rely on the position information obtained from the passive beacon 120. In aspects, when the passive beacon 120 in the vehicle power-transfer apparatus 114 is positioned directly above the sense loops of the base receiver 122, the position of the passive beacon 120 relative to the base receiver 122 can be determined with high accuracy.

If the electric vehicle 102 overshoots the base power-transfer apparatus 110 during a parking maneuver, then the vehicle enters a departure sector 206. In the departure sector 206, the base receiver 122 may use the position information obtained from the active beacon 118 to detect the position of the vehicle power-transfer apparatus 114 relative to the base power-transfer apparatus 110 or a target location on the base power-transfer apparatus 110.

Accordingly, both the active beacon 118 and the passive beacon 120 may be operational during the parking maneuver, and the base receiver 122 can process signals received from both beacons. However, the passive beacon 120 may only be detectable by the base receiver 122 when the passive beacon 120 is overlapping the base receiver 122, e.g., when the passive beacon 120 is directly above the sense loops of the base receiver 122. Consequently, the base receiver 122 may utilize the position information obtained from the active beacon 118 until the passive beacon is detected. Then the base receiver 122 may automatically switch to using the position information obtained from the passive beacon 120 once it becomes available.

In another example, when a processor of the base power-transfer apparatus 110 detects the active beacon of the electric vehicle 102 in the approach sector 202, the FOD system begins listening (e.g., monitoring) for the passive beacon modulation. The base receiver 122 can detect highly-accurate position information from the passive beacon 120 of the electric vehicle 102 directly over the base power-transfer apparatus 110, and accurate position information from the active beacon 118 in areas around the base power-transfer apparatus 110. Thus, the active beacon 118 enlarges the area where position information is provided by the electric vehicle 102 when used in conjunction with the passive beacon 120.

Figure 3:
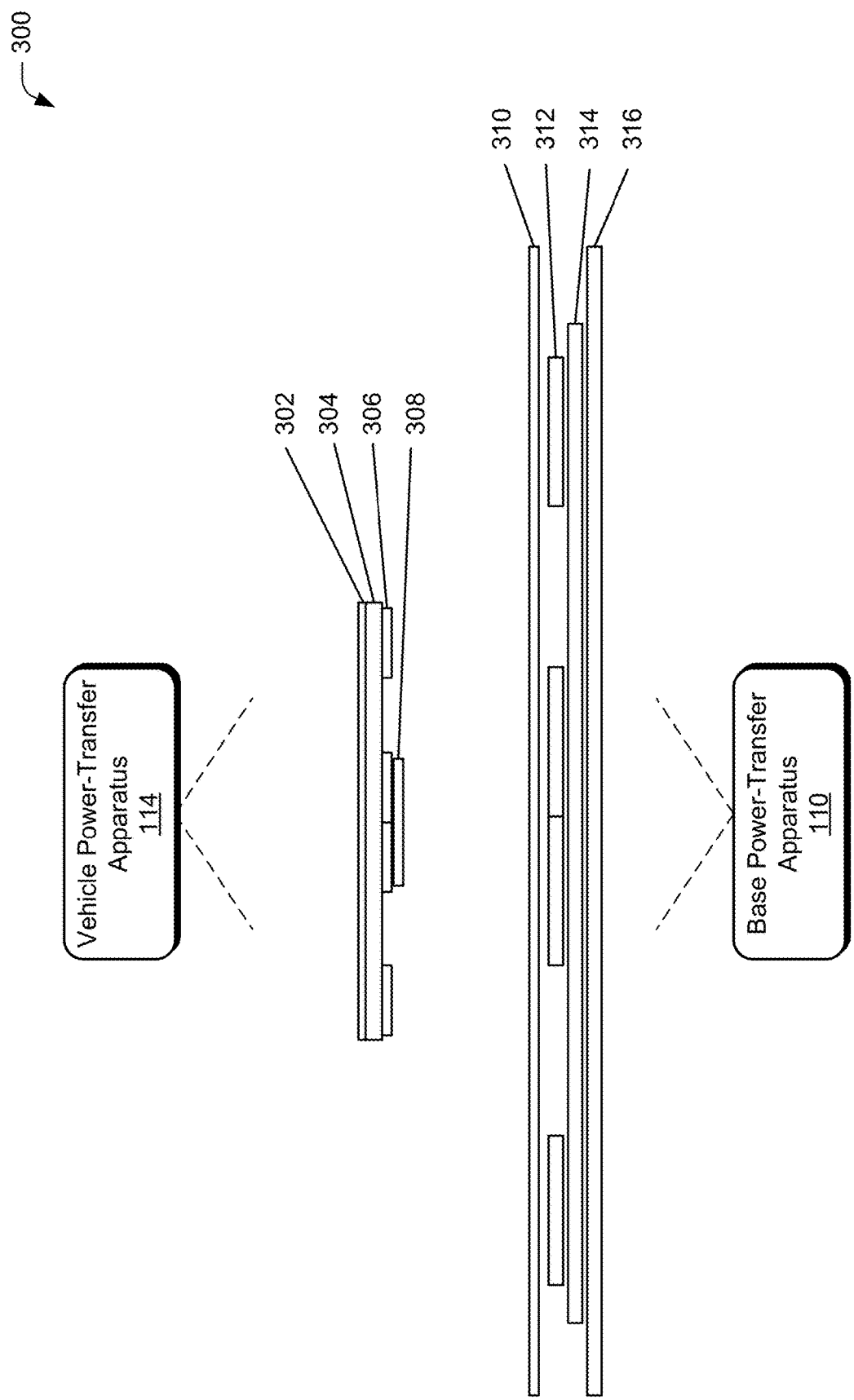
FIG. 3 illustrates an example layer structure of WEVC magnetics with an integrated passive beacon and a FOD loop array.

FIG. 3 illustrates an example layer structure 300 of wireless electric vehicle charging (WEVC) magnetics with an integrated beacon loop and a FOD loop array. The vehicle power-transfer apparatus 114 is illustrated as including a backplate 302, ferrite 304, an inductive power-transfer (IPT) coil 306, and a passive beacon loop 308. The backplate 302 is configured to shield components of the vehicle from a magnetic field induced by the base power-transfer apparatus 110. The ferrite 304 is configured to channel magnetic flux of the magnetic field. The passive beacon loop 308 is configured to create a modulation that is detectable by sense loops in the base receiver 122 from FIG. 1 of the base power-transfer apparatus 110 (may be configured as a resonator to provide more effective modulation). The IPT coil 306 can be used as the active-beacon transmitter antenna, or a dedicated coil may be used. Different coil topologies leading to different field polarizations can be used. For example, a double-D (DD) coil or solenoid coil generates predominantly horizontal magnetic field components (e.g., substantially coplanar with a plane defined by the coil), and a circular coil generates predominantly vertical magnetic field components (e.g., substantially orthogonal to the plane defined by the coil).

The base power-transfer apparatus 110 is illustrated as including an FOD loop array 310, an IPT coil 312, ferrite 314, and a backplate 316. The FOD loop array 310 is disposed above the IPT coil 312, which is positioned above the ferrite 314. In this way, the IPT coil 312 (e.g., Litz wire) rests in between the ferrite 314 and the FOD loop array 310, in contrast to other systems that include coils between the ferrite and the Litz wire. In other words, the FOD loop array 310 includes at least two sense loops each including a receiver coil disposed proximate to the coil 312 on an opposite side of the coil 312 from the ferrite 314. The FOD loop array 310 includes a plurality of sense loops that detect a presence of foreign metal objects, including the passive beacon loop 308 and the IPT coil 306 (e.g., acting as the active beacon 118), above or near the base power-transfer apparatus 110. The FOD loop array 310 can represent the base receiver 122 of FIG. 1. The FOD system using sense loops is configured to detect the presence of inadvertently positioned passive metal foreign objects (e.g., a coin). The presence of these inadvertent metal objects is detected based on interaction of the metal objects with fields generated by the sense loops which, for example, changes the impedance at the sense loops, which can then be detected. The sense loops are configured to generate high-frequency magnetic fields that can interact with metal objects and create detectable changes, e.g., impedance, at the sense loops to be able to detect the metal objects. The FOD system can determine a position of the metal object, the passive beacon loop 308, or the active beacon 118, based on a detectable change experienced by one or more sense loops in the FOD loop array 310. For instance, when the passive beacon loop 308 is positioned over the FOD loop array 310, one or more of the sense loops in the array may detect an impedance change and one or more other sense loops in the array may not detect any impedance change (or at least an impedance change in the one or more other sense loops is less than the impedance change in the one or more of the sense loops). As the passive beacon loop 308 moves over the FOD loop array 310, the impedance change in some of the sense loops may decrease or increase, providing an indication that the passive beacon loop 308 is moving toward an area corresponding to particular sense loops that are detecting the increased impedance change.

The overall resulting system structure may be symmetric in terms of the layer structure. The FOD loop array in the base power-transfer apparatus 110 is integrated into a shell, e.g., housing, of the base power-transfer apparatus 110. Likewise, the passive beacon loop in the vehicle power-transfer apparatus 114 is integrated into a shell of the vehicle power-transfer apparatus 114.

Figure 4:
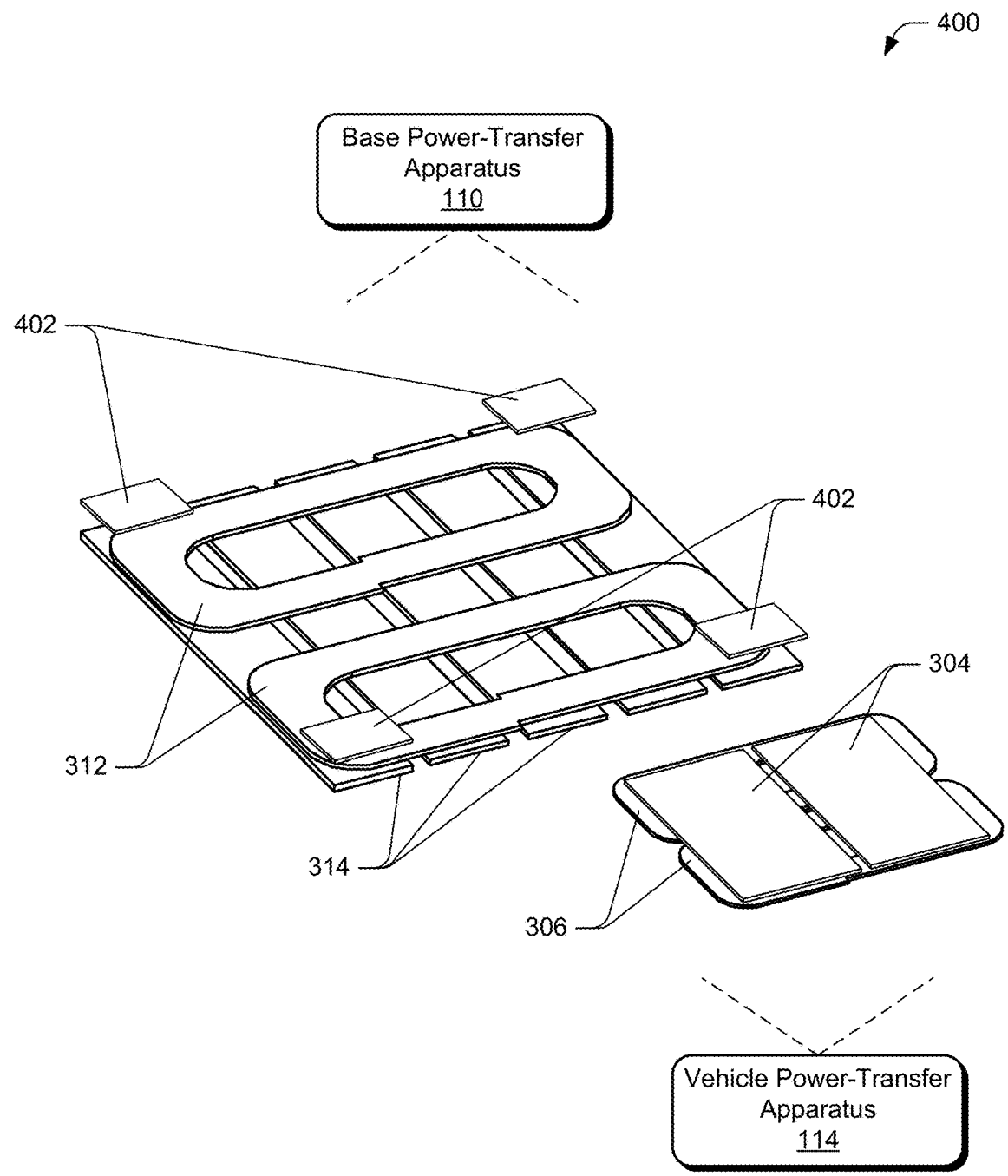
FIG. 4 illustrates an example implementation of a magnetic structure for a base power-transfer system configured for active-beacon positioning.

FIG. 4 illustrates an example implementation 400 of a magnetic structure for a base power-transfer system configured for active-beacon positioning. In the illustrated example, the base power-transfer apparatus 110 includes sense loops 402 each positioned proximate to a corner of the base power-transfer apparatus 110. These circular corner loops can be used as active-beacon receiver antennas. Although the illustrated example is described with reference to corners, the sense loops 402 can be arranged in any configuration of spaced apart sense loops. In addition, the vehicle power-transfer apparatus 114 is illustrated with the ferrite 304 and the IPT coil 306. Other elements of the vehicle power-transfer apparatus 114 and of the base power-transfer apparatus 110 are not shown for simplicity of the discussion. The ferrite structure of both base and vehicle power-transfer apparatuses influences the coupling between the different loop antennas involved and therefore considerably shapes the resulting field profile. In some cases, the vehicle power-transfer apparatus 114 includes a horizontally-polarized transmitter such that the polarization of the transmitter is substantially parallel to a plane defined by the transmitter, and each of the sense loops 402 are circular receivers (also referred to as circular receiver coils), which are vertically-polarized such that the polarization of the circular receivers is substantially orthogonal to a plane defined by the circular receiver. For a horizontally polarized transmitter, the polarization can be in either an X- or Y-direction. In some implementations, the sense loops 402 could be horizontally polarized (e.g., in a DD configuration) while the active beacon loop may be vertically polarized (e.g., in a circular configuration). There may be benefits to at least having the active beacon coil polarized in a different direction than the FOD sense loops, which may allow for increased position sensitivity. In addition, the circular receiver coils (e.g., the sense loops 402) are substantially smaller in size than the transmitter coil (e.g., the IPT coil 306). Each receiver coil is a small localized antenna above a larger IPT coil 312 and a larger ferrite surface (e.g., ferrite 314). For example, each receiver coil defines a planar area that is smaller than an area defined by the ferrite surface facing the receiver coil. Examples of size differences include the receiver coil 402 being approximately $1/128$, $1/64$, $1/32$, or $1/16$ the size of the surface of the ferrite 314.

As for the antennas, there are different options to implement the transmit electronics and the receive electronics. If using the vehicle IPT coil 306 as the active-beacon transmitter antenna, the driver circuit that applies a signal to the IPT coil 306 for the active beacon can be integrated with the vehicle-side power electronics. If using a dedicated, separate coil as the transmitter antenna, the electronics can also be separated (e.g., the driver circuit can be integrated with the vehicle-side power electronics). On the receiver side, electronics can be integrated with the FOD electronics, leading to only minor changes in the analog circuitry of FOD. Alternatively, separate electronics can be used on the receiver side.

An example frequency range usable with the active beacon can be in a range of approximately 20 kHz to 30 MHz. However, the currently used range is 119-148.5 kHz due to given regulatory constraints. The transmitted signal in its simplest form includes a continuous wave (CW). Modulation (amplitude modulation (AM), frequency modulation (FM), or phase modulation (PM)) can be added if additional information needs to be transferred.

Figure 5:
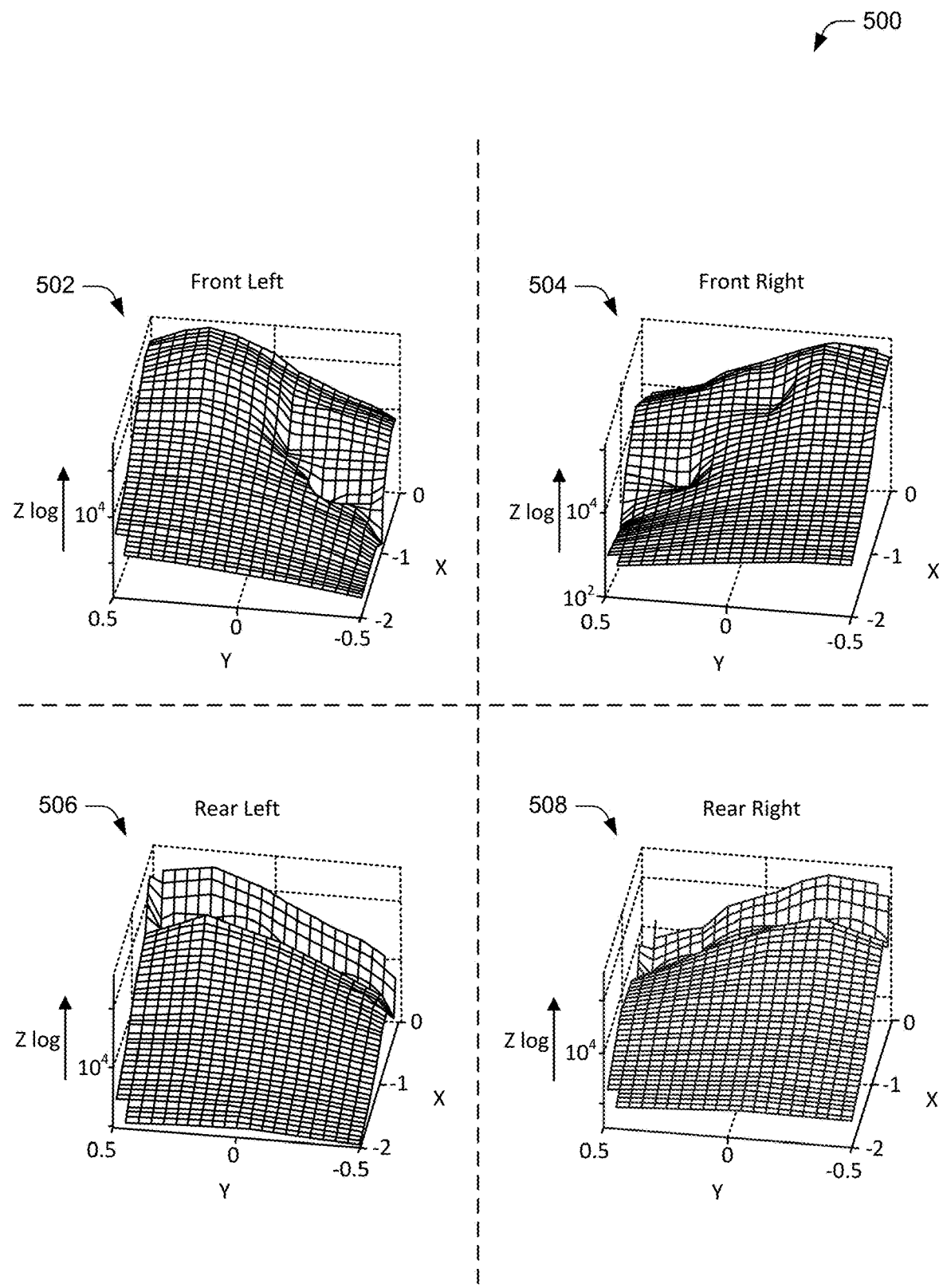
FIG. 5 illustrates an example of resulting induced voltage for example corner active-beacon receiver antennas as a function of a position of the vehicle power-transfer system.

FIG. 5 illustrates an example 500 of resulting induced voltage for each corner active-beacon receiver antenna as a function of a position of the vehicle power-transfer apparatus (active-beacon transmitter). In an example, the vehicle IPT coil 306 is used as an active-beacon transmitter antenna. The vehicle IPT coil 306 is implemented as a DD coil, generating a predominantly horizontal magnetic field in the X-direction. On the base side, the four corner loops (front left 502, front right 504, rear left 506, and rear right 508) of the FOD system are used as the active-beacon receiver antennas.

In the illustrated example, the amplitude of the induced voltage for each of the active-beacon receiver antennas is measured. The two upper graphs represent the front left 502 loop and the front right 504 loop, e.g., the front being the side of the base power-transfer apparatus 110 that the electric vehicle approaches when performing a parking maneuver. The two lower graphs represent the rear left 506 loop and the rear right 508 loop, e.g., the rear being opposite the front.

Aligning the vehicle power-transfer apparatus 114 on the left side of a centerline (Y>0) of the IPT coil 312 of the base power-transfer apparatus 110 leads to a higher receive signal level (e.g., magnitude) in the left loops and lower receive signal levels in the right loops. Aligning the vehicle power-transfer apparatus 114 on the right side of the centerline (Y<0) leads to the opposite situation, e.g., a lower receive signal level in the left loops and higher receive signal levels in the right loops. Having the vehicle power-transfer apparatus 114 positioned at Y=0 leads to substantially equal receive signal levels in both the left and right loops. Moving the vehicle power-transfer apparatus 114 in the X-direction leads to higher receive signal levels for closer positions and lower receive signal levels for positions farther away.

The associated function may rise monotonously, at least for the rear loops. This overall behavior leads to a robust and stable system as the Y-position can be estimated simply by evaluating the balance between left and right loops, and the X-position can be estimated based on absolute receive levels, as described in further detail below. To use the absolute receive levels, a positioning system uses the transmitter current.

Figure 6:
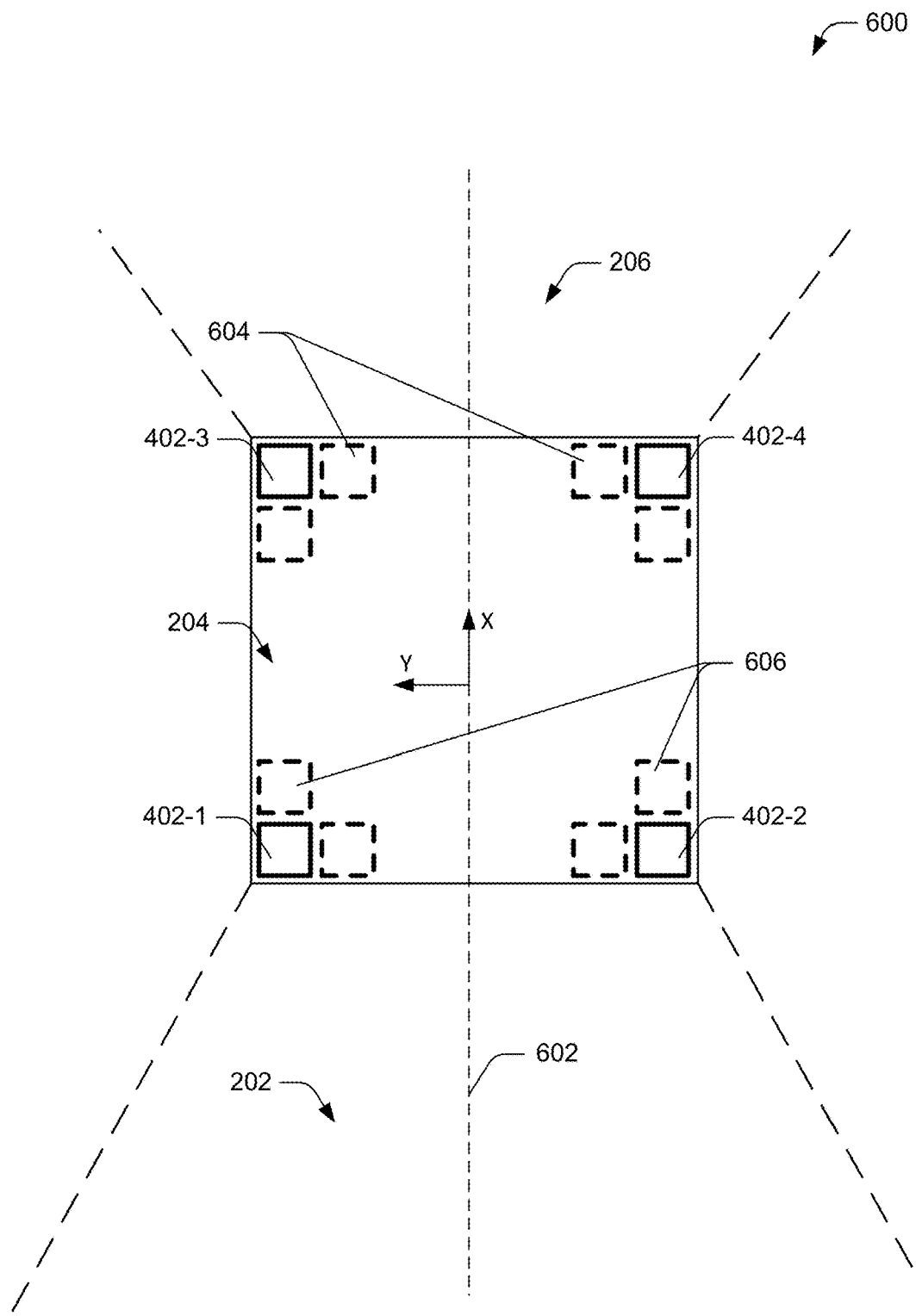
FIG. 6 illustrates an example arrangement of multiple active-beacon receiver antennas.

FIG. 6 illustrates an example arrangement of multiple active-beacon receiver antennas 600. In aspects, the positioning system determines a distance estimate g from a target position (e.g., center of the FOD loop array 310 of FIG. 3) to the active beacon 118, and a lateral offset estimate $\hat{Y}$ defining a distance that the vehicle power-transfer apparatus 114 (or the active beacon 118) is offset from a centerline 602 of the base power-transfer apparatus 110. Any suitable antenna can be used for positioning information, such as sense loops 402 in the FOD loop array 310. For example, the positioning algorithm may determine the distance estimate g and the lateral offset estimate Y using corner sense loops 402 (e.g., front-left loop 402-1, front-right loop 402-2, rear-left loop 402-3, and rear-right loop 402-4). Alternatively, the positioning system can use measurements from sense loops that are not in the corners of the FOD loop array 310. In an example, sense loops adjacent to the corner loops can be used for positioning information, such as sense loops 604 (adjacent to the corner loops in the Y-direction) or sense loops 606 (adjacent to the corner loops in the X-direction), or any combination of sense loops. Although only a few corner loops (e.g., corner sense loops 402, sense loops 604, sense loops 606) of the FOD loop array 310 are illustrated in the example shown in FIG. 6, the FOD loop array 310 is filled with loops covering the entire array and only the loops involved for the active beacon are shown. This is but one example arrangement of the active beacon receiver antennas and other arrangements employing other sense loops in the FOD loop array 310 are also contemplated.

Further, any suitable number of antennas may be utilized to obtain the positioning information, such as only two (e.g., left and right), 6, 8, 10, and so on. The following example is described simply with the four corner sense loops 402, with the approach sector 202 interfacing with the front-left loop 402-1 and the front-right loop 402-2, and the departure sector 206 interfacing with the rear-left loop 402-3 and the rear-right loop 402-4. From the perspective of the positioning system, the X-position of the electric vehicle 102 (or the active beacon 118 on the electric vehicle 102) can be separated into at least three sectors: the approach sector 202 (negative X-positions excluding positions on the base power-transfer apparatus 110), the target sector 204 (on the base power-transfer apparatus 110), and the departure sector 206 (positive X-position excluding positions on the base power-transfer apparatus 110).

The approach sector 202 includes an area proximate to and outside of the target sector 204, and in front of the base power-transfer apparatus 110 such that the electric vehicle 102 enters the approach sector 202 as it approaches the base power-transfer apparatus 110. The departure sector 206 defines an area proximate to and outside of the target sector 204, and in the rear of the base power-transfer apparatus 110 as the electric vehicle approaches the base power-transfer apparatus 110, such that the electric vehicle 102 enters the departure sector 206 if it overshoots the target sector 204. However, once the electric vehicle 102 is in the departure sector 206, the positioning system may treat the departure sector 206 as an approach sector and the approach sector 202 as a departure sector (e.g., reverse the roles of the sectors) to determining positioning information of the electric vehicle 102 as the electric vehicle 102 "approaches" the target sector 204 by backing up. As described above, the active-beacon-positioning system is utilized in the approach sector 202 and the departure sector 206, whereas the passive-beacon-positioning system is utilized in the target sector 204 (area defined by the plurality of FOD sense loops). However, both systems may operate in each sector and position information can be obtained in each sector from both the active-beacon-positioning system and the passive-beacon-positioning system.

Each of the receiver antennas generates a voltage ($V_{AB}$), which is captured as raw data of the active-beacon-positioning system. The term AB represents the particular active beacon, such as the front-left (FL), the front-right (FR), the rear-left (RL), or the rear-right (RR).

To estimate the position P including the distance estimation $\hat{X}$ and the lateral offset estimation $\hat{Y}$, complex voltages are measured as $V_{AB} = I_{AB} + jQ_{AB}$, with in-phase I and quadrature Q components at each of two or more sense loops. For each corner loop's complex value, a calibrated magnitude $V_{AB\_c}$ is computed. The calibrated magnitude $V_{AB\_c}$ can be computed using the following equation:

$$V_{AB\_C} = C_{AB}\sqrt{I_{AB}^2 + Q_{AB}^2} \qquad \text{Equation 1}$$

A calibration factor $C_{AB}$ is used to account for differences in receiver gains and is applied to the magnitude of each receive voltage. An expected value range can be any suitable range, e.g., from −2 to 2. In an example, the nominal $C_{AB}$ value for all four receive loops is one (1.0). For the distance estimation $\hat{X}$, a logarithm of the sum of squares can be used as follows:

$$\hat{X} = G_x \cdot \log_{10}(V_{RL}^2 + V_{RR}^2) + O_{\hat{x}} \qquad \text{Equation 2}$$

where the parameters $G_x$ and $O_{\hat{x}}$ are configurable parameters that can be used to calibrate the system. Optionally, similar calculations can be performed using the front loops. The Equation 2 allows calculation from a target point (e.g., center of the base power-transfer apparatus 110) to the active beacon.

The lateral offset estimate $\hat{Y}$ can be determined using the sum of the magnitudes of the rear loops, with an exponent $c_d$ accounting for amplitude changes with distance, using the following equation:

$$\hat{Y} = G_y \cdot (V_{RL} + V_{RR})^{c_d} + O_{\hat{y}} \qquad \text{Equation 3}$$

where the parameters $G_y$ and $O_{\hat{y}}$ are configurable parameters that can be used to calibrate the system. Alternatively, the lateral offset estimate $\hat{Y}$ can be determined using the sum of the magnitudes of the front loops, or a combination of the front and rear loops.

Example Active Beacon Generation Circuitry

Figure 7:
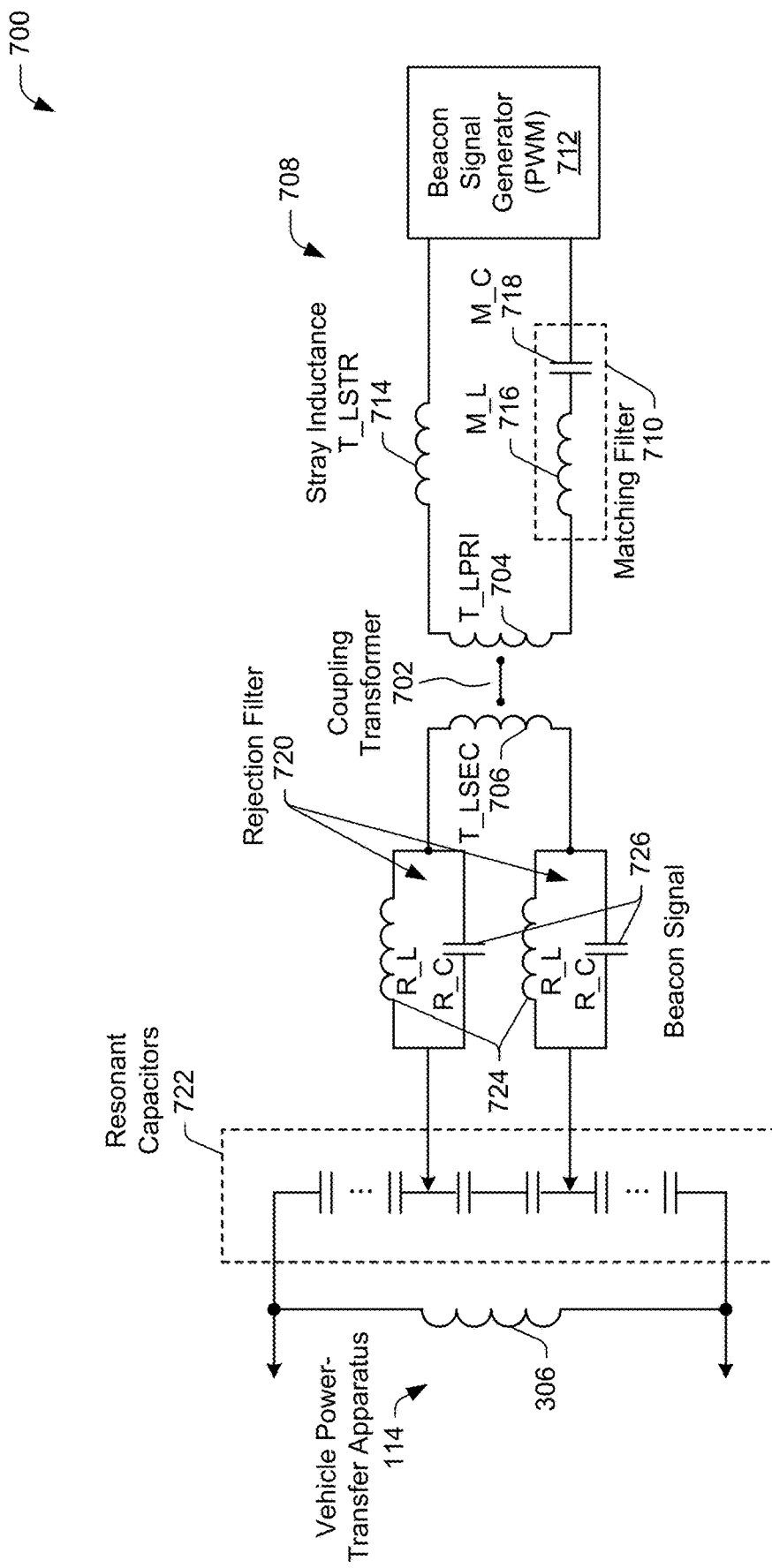
FIG. 7 illustrates an example implementation of an active-beacon transmitter circuit usable to employ an active beacon for an extended-range positioning system based on FOD.
Figure 8:
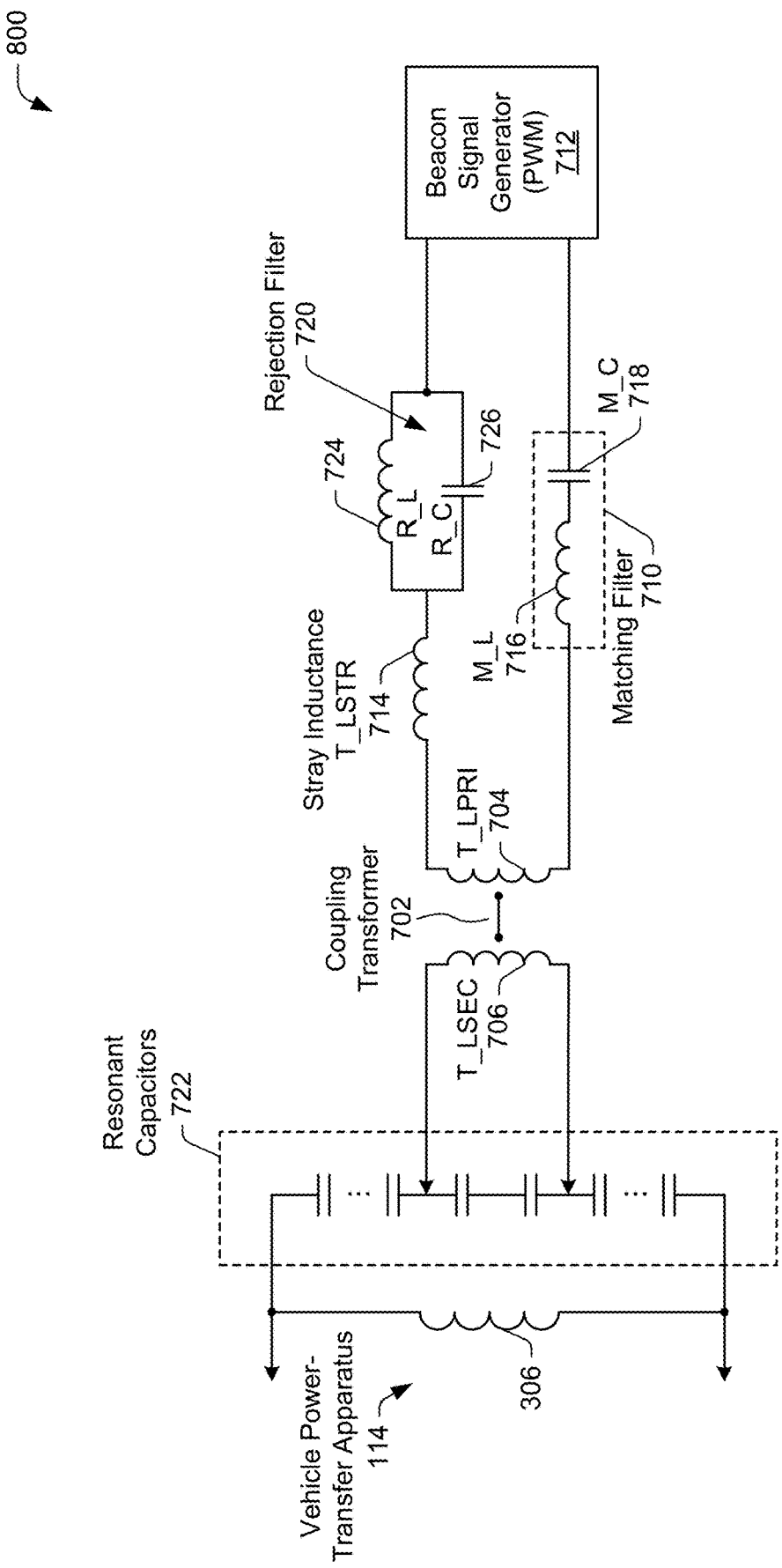
FIG. 8 illustrates another example implementation of an active-beacon transmitter circuit usable to employ an active beacon for an extended-range positioning system based on FOD.
Figure 9:
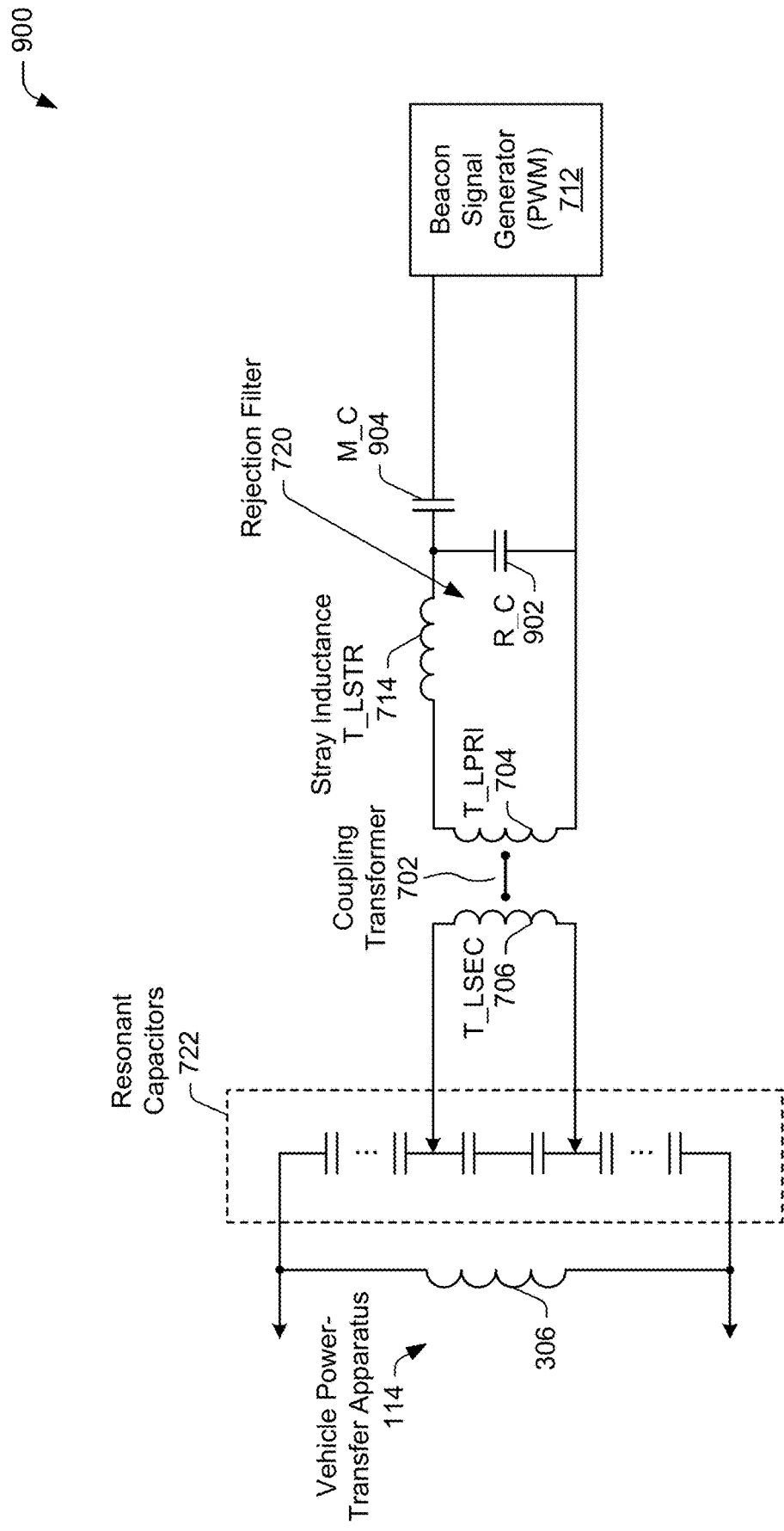
FIG. 9 illustrates yet another example implementation of an active-beacon transmitter circuit usable to employ an active beacon for an extended-range positioning system based on FOD.

Example hardware circuits used to generate a beacon signal on the vehicle side and to receive the beacon signal with FOD on the base side are described with respect to FIGS. 7-9. These example implementations are described with various components for use with extended-range positioning. In the described implementations, the vehicle IPT coil 306 (represented as an inductor) of the vehicle power-transfer apparatus 114 is used as a beacon transmitter antenna based on the current supplied to the IPT coil 306. In this way, a circuit can be built that either adds to the existing power electronics used for inductive power transfer, or that is more independent of it. A more independent circuit may be more modular and less impactful on the rest of the system. Because of this, the example implementations described herein use a coupling transformer to couple to a portion of an IPT parallel tuning capacitor. The coupling transformer couples to the resonant capacitors of the IPT system. Since the tuning capacitor is built as an array of series and parallel connected capacitors, different coupling points exist that have different impedances. Thus, the exact coupling points can be adapted based on the IPT design and the available drive voltage for the beacon signal transmitter.

FIG. 7 illustrates an example implementation 700 of an active-beacon transmitter circuit (also referred to as a signal generator circuit) usable to employ the active beacon for the extended-range positioning system based on FOD. The illustrated example includes a coupling transformer 702 with a primary side T_LPRI 704 and a secondary side T_LSEC 706. A primary side circuit 708 on the primary side T_LPRI 704 of the coupling transformer 702 includes a series resonant circuit (e.g., matching filter 710) to provide gain for the beacon signal and increase attenuation for harmonics of the beacon signal. In aspects, the primary side circuit 708 may include both a beacon signal generator 712 and the matching filter 710. The beacon signal generator 712 can generate any suitable carrier wave signal, such as 120 kHz, as the active beacon frequency. The generated signal may be a rectangular signal generated with a half- or full-bridge circuit. Resulting harmonics content of a rectangular signal is sufficiently suppressed by the active-beacon transmitter circuit such that primarily the fundamental frequency is emitted by the active-beacon transmitter antenna. The matching filter 710 is configured to match the coupling transformer's 702 stray inductance 714 by using a matching inductance M_L 716 in series with a matching capacitance M_C 718 to be resonant at the beacon frequency. Connected to the secondary side T_LSEC 706 of the coupling transformer 702 are rejection filters 720 configured to suppress high voltages from resonant capacitors 722 during power transfer. Each rejection filter 720 includes a rejection inductor R_L 724 in parallel with a rejection capacitor R_C 726. In aspects, the rejection filter 720 is tuned to an operating frequency of the vehicle power-transfer apparatus 114 (e.g., 85 kHz).

FIG. 8 illustrates another example implementation 800 of an active-beacon transmitter circuit usable to employ the active beacon for the extended-range positioning system based on FOD. In this example implementation 800, the rejection filter 720 is located on the primary side 704 of the coupling transformer 702, resulting in less components connected to the high voltage side, e.g., the resonant capacitors 722. This can reduce cost, but as a drawback, a magnetizing inductance of the coupling transformer 702 is required to withstand the high voltage present across the secondary side T_LSEC 706 of the coupling transformer 702. To further reduce component count, the matching inductance M_L 716 can be realized by the coupling transformer's 702 stray inductance T_LSTR 714.

FIG. 9 illustrates yet another example implementation 900 of an active-beacon transmitter circuit usable to employ the active beacon for the extended-range positioning system based on FOD. In aspects, the rejection filter 720 is incorporated into the coupling transformer 702 by using the stray inductance 714 of the coupling transformer 702 together with a shunt capacitor R_C 902 on the primary side 704 of the coupling transformer 702, e.g., connected to the beacon signal generator 712. Together with a series capacitor M_C 904, the stray inductance 714 also acts as a series resonant circuit to boost the beacon signal generated by the beacon signal generator 712. This example circuit may be implemented at lower cost because all additional inductors are omitted and the existing stray inductance is used for multiple purposes.

Example Active-Beacon Receiver Circuit

Figure 10A:
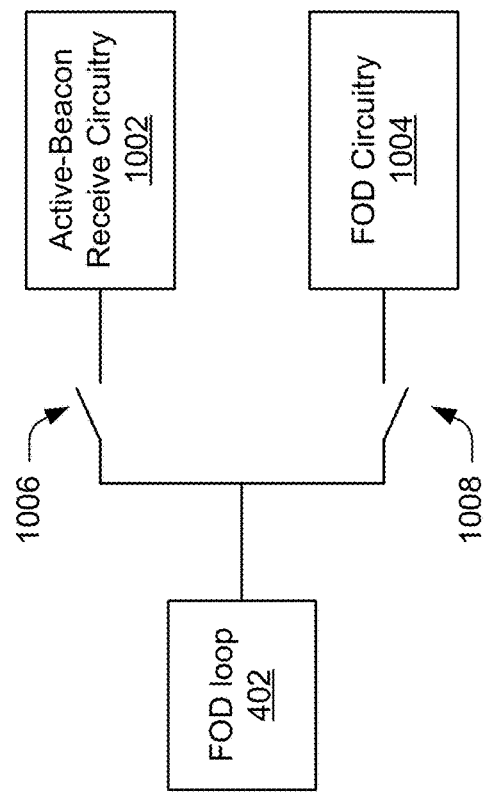
FIG. 10A illustrates an example implementation of a FOD system.

FIG. 10A illustrates an example implementation 1000 of an FOD system. A FOD analog frontend (e.g., sense loop 402) is coupled to active-beacon receive circuitry 1002 and FOD circuitry 1004. In some implementations, the sense loop 402 is connected to the active-beacon receive circuitry 1002 and the FOD circuitry 1004 via switches, such as switch 1006 and switch 1008, respectively. Alternatively, the sense loop 402 may be connected to one or both the active-beacon receive circuitry 1002 and the FOD circuitry 1004 without a switch. The active-beacon receive circuitry 1002 is configured to detect the active beacon 118 of the vehicle power-transfer apparatus 114. In an example, the active-beacon receive circuitry 1002 may include a capacitor (not shown) connected in parallel to the sense loop 402. The FOD circuitry 1004 is configured to detect passive foreign metal objects, such as inadvertent metal objects as described above.

Figure 10B:
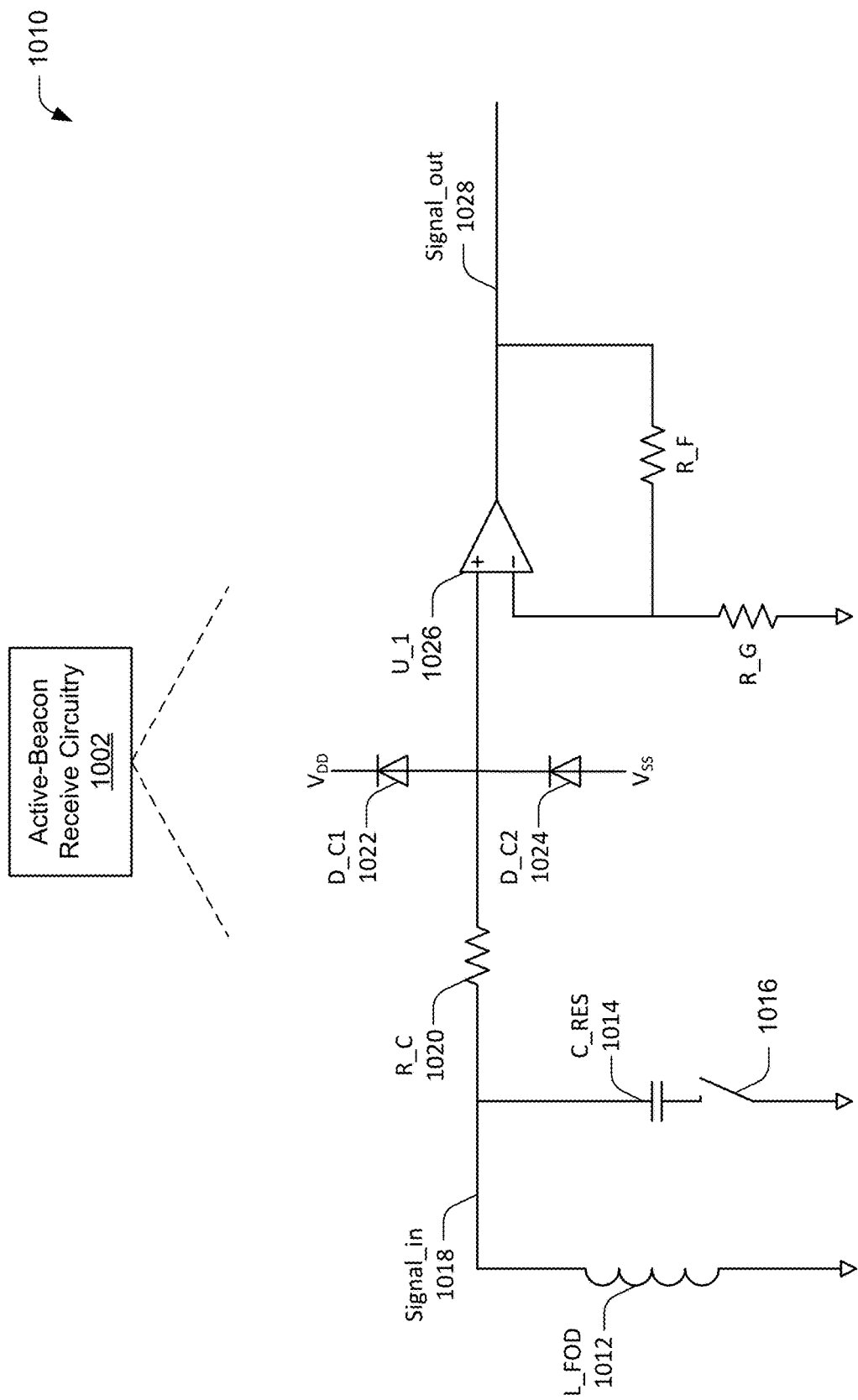
FIG. 10B illustrates an example implementation of an active-beacon receiver circuit from FIG. 10A.

FIG. 10B illustrates an example implementation 1010 of the active-beacon receive circuitry 1002 from FIG. 10A. A FOD analog frontend is optimized to measure the inductance of the attached loop. The receiver sensitivity can be increased to reduce requirements on the transmitter side to provide high currents. In the illustrated example, inductor L_FOD 1012 represents the FOD loop (e.g., sense loop 402) serving as an active-beacon receiver antenna. For the active beacon receive circuitry 1002, the FOD loop (e.g., inductor L_FOD 1012) is operated in parallel resonance (e.g., parallel with capacitor C_RES 1014) to boost the received induced voltage by Q (quality factor of the resonator). A switch 1016 (e.g., single-pole single-throw (SPST) relay) is used between the capacitor C_RES 1014 and ground to open up the resonant circuit (L_FOD 1012/C_RES 1014) during power transfer of the WEVC system. If not opened, the induced voltage into the L_FOD 1012 can create a substantial current in the resonant circuit, which is undesirable.

The resulting voltage at node "signal_in" 1018 is coupled via a clipper circuit (resistor R_C 1020 coupled to diode D_C1 1022 and diode D_C2 1024) to a preamplifier U_1 1026. The clipper circuit is used to protect the operational amplifier from excessive input voltage during inductive power transfer. The output of the preamplifier U_1 1026 (e.g., resulting "signal_out" 1028) is fed back into the normal FOD analog frontend circuit to be measured by the analog-to-digital converter of the FOD digital processing unit. This example circuit provides a higher signal-to-noise ratio compared to the original FOD analog frontend circuit. In aspects, this example circuit can be combined with the FOD analog frontend such that the FOD loop can be used for both active-beacon positioning and foreign object detection.

Example Methods

Figure 11:
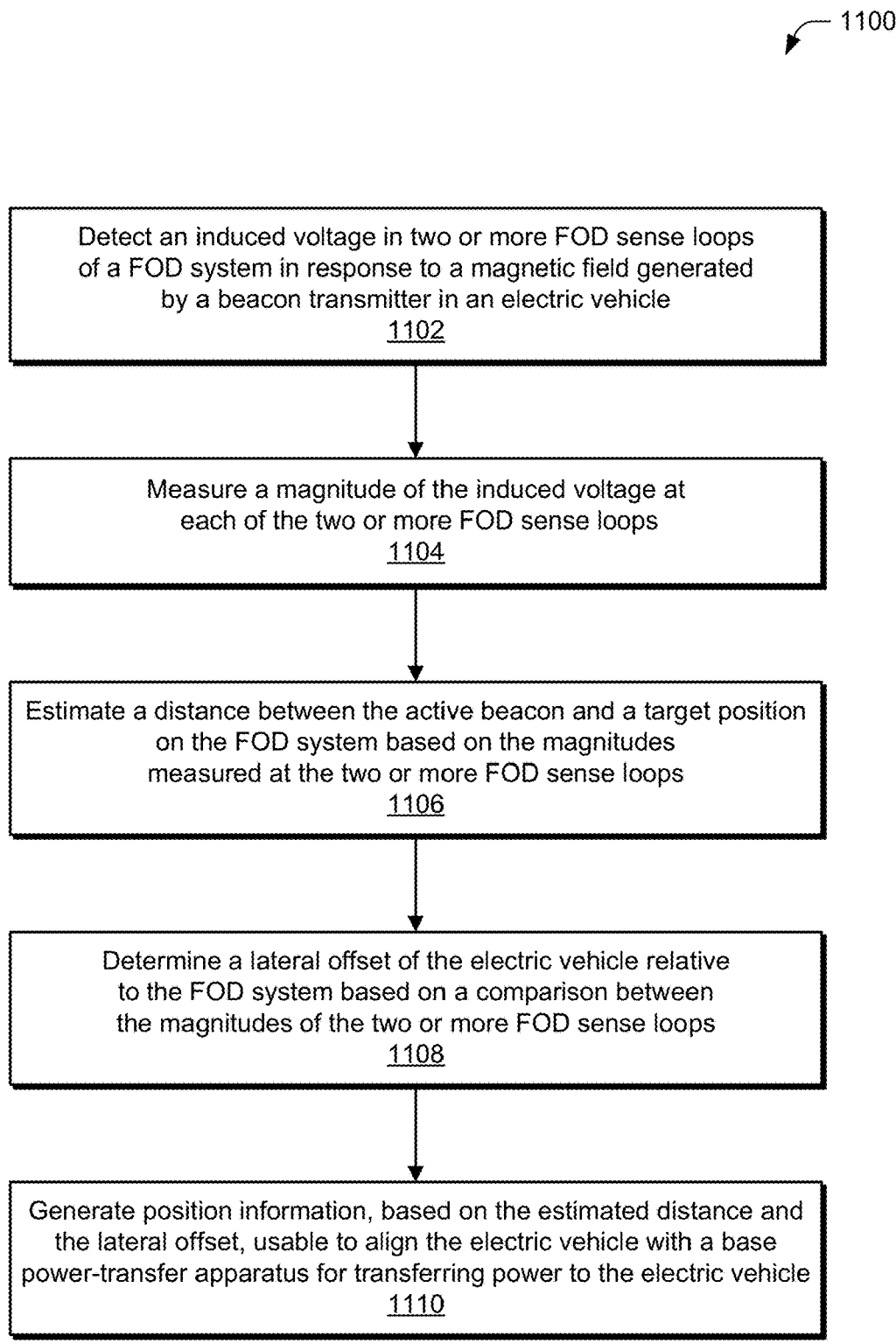
FIG. 11 depicts a flow diagram of an example process for detecting presence and position of an active beacon based on foreign object detection.

FIG. 11 describes an example procedure 1100 for detecting presence and position of an active beacon. The example procedures may be employed in the implementations and systems described with respect to FIGS. 1-10, and/or any other suitable environment. The steps described for the various procedures can be implemented automatically and independent of user interaction. The orders in which operations of these procedures are shown and/or described are not intended to be construed as a limitation, and any number or combination of the described procedure operations can be combined in any order to implement a method, or an alternate method.

At 1102, an induced voltage is detected in two or more FOD sense loops of a FOD system in response to a magnetic field generated by a beacon transmitter in an electric vehicle. In an example, sense loops 402, which may be corner loops of the FOD loop array 310 of a FOD system, detect an induced voltage when the active beacon 118 of the electric vehicle 102 approaches the base power-transfer apparatus 110. In certain aspects, the sense loops 402 may be vertically-polarized circular coils whereas the active beacon 118 is horizontally polarized, e.g., a DD-coil or solenoid topology.

At 1104, a magnitude of the induced voltage is measured at each of the two or more FOD sense loops. In aspects, a calibrated magnitude of a complex value of each sense loop 402 is computed. Examples of this computation are described above with respect to FIG. 6.

At 1106, a distance between the active beacon and a target position on the FOD system is estimated based on the magnitudes measured at the two or more FOD sense loops. In an example, the distance between target position (e.g., center of the FOD system) and the active beacon 118 is estimated based on a logarithm of the sum of squares of the magnitudes of the sense loops 402.

At 1108, a lateral offset of the electric vehicle is determined relative to the FOD system based on a comparison between the magnitudes of the two or more FOD sense loops. In aspects, the lateral offset indicates an amount (e.g., distance) by which the electric vehicle 102 is misaligned from a centerline of the FOD system or of the base power-transfer apparatus 110. The lateral offset (e.g., estimated offset distance) can be based on the sum of magnitudes of FOD sense loops on opposing sides of the centerline. An example calculation of the lateral offset is described above with respect to FIG. 6.

At 1110, position information is generated, based on the estimated distance and the lateral offset, usable to align the electric vehicle with a base power-transfer apparatus for transferring power to the electric vehicle. In one example, the position information is usable to align the electric vehicle 102 with the base power-transfer apparatus 110. The position information can be transmitted over a wireless communication link to a vehicle electronic system and used by the vehicle electronic system to provide feedback to the driver of the vehicle regarding the vehicle's position relative to the base power-transfer system. The position information can be made available to a driver of the electric vehicle 102 using a graphical representation and/or audible signals or used in an autonomous driving system in the electric vehicle 102. Over time and as the electric vehicle 102 moves, the position information can be updated and periodically or continuously provided to the vehicle electronic system. In some aspects, data is transmitted to the vehicle electronic system and final positioning estimation is completed at the vehicle. Providing such positioning information to the driver or the autonomous driving system can enable the driver (or the autonomous driving system) to correctly align the electric vehicle with the base power-transfer system.

Example Wireless Power-Transfer System

Figure 12:
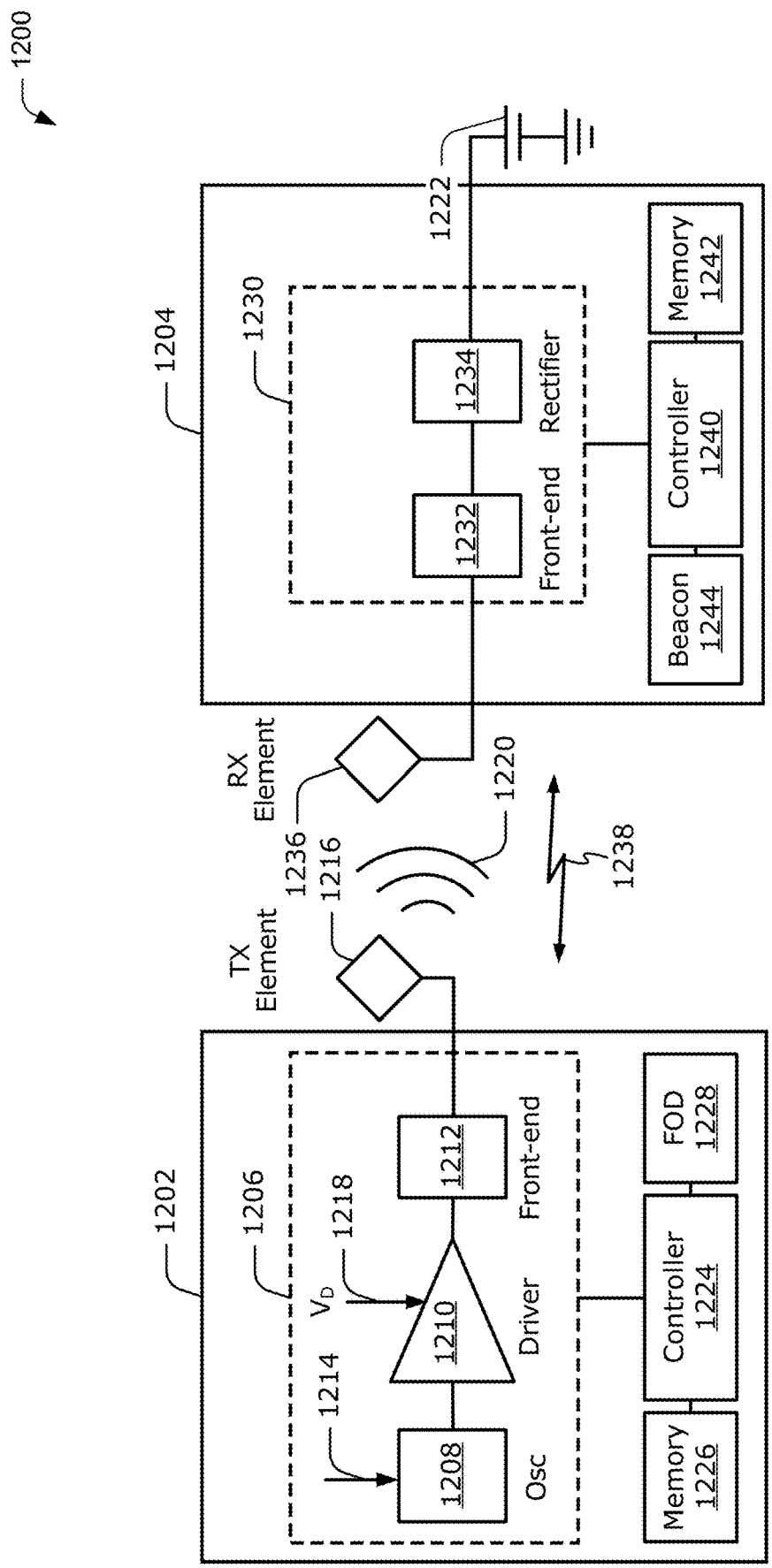
FIG. 12 illustrates an example wireless power-transfer system.

FIG. 12 illustrates an example wireless power-transfer system 1200, which includes components capable of implementing aspects of an extended-range positioning system based on foreign-object detection. The system 1200 includes a transmitter 1202 and a receiver 1204. The transmitter 1202 may include transmit circuitry 1206 having an oscillator 1208 (e.g., inverter), a driver circuit 1210, and a front-end circuit 1212. The oscillator 1208 may be configured to generate an oscillator signal at a desired frequency that may adjust in response to a frequency control signal 1214. The oscillator 1208 may provide the oscillator signal to the driver circuit 1210. The driver circuit 1210 may be configured to drive a power transmitting element 1216 (e.g., IPT coil 312 from FIG. 3) at, for example, a resonant frequency of the power transmitting element 1216 based on an input voltage signal (VD) 1218.

The front-end circuit 1212 may include a filter circuit configured to filter out harmonics or other unwanted frequencies. The front-end circuit 1212 may include a matching circuit configured to match the impedance of the transmitter 1202 to the impedance of the power transmitting element 1216. The front-end circuit 1212 may also include a tuning circuit to create a resonant circuit with the power transmitting element 1216. As a result of driving the power transmitting element 1216, the power transmitting element 1216 may generate an electromagnetic field 1220 to wirelessly output power at a level sufficient for charging a battery 1222, or otherwise powering a load.

The transmitter 1202 may further include a controller 1224 operably coupled to the transmit circuitry 1206 and configured to control one or more aspects of the transmit circuitry 1206, or accomplish other operations relevant to extended-range positioning for a hybrid foreign-object detection and positioning system. The controller 1224 may be a micro-controller or a processor. The controller 1224 may be implemented as an application-specific integrated circuit (ASIC). The controller 1224 may be operably connected, directly or indirectly, to each component of the transmit circuitry 1206. The controller 1224 may be further configured to receive information from each of the components of the transmit circuitry 1206 and perform calculations based on the received information. The controller 1224 may be configured to generate control signals (e.g., the frequency control signal 1214) for each of the components that may adjust the operation of that component. As such, the controller 1224 may be configured to adjust or manage the inductive power-transfer based on a result of the operations it performs. The transmitter 1202 may further include a memory 1226 configured to store data, for example, such as instructions for causing the controller 1224 to perform particular functions, such as those related to management of wireless power-transfer and/or foreign-object detection and positioning.

The transmitter 1202 may also include a foreign-object-detection (FOD) circuit 1228. The FOD circuit 1228 is coupled to the controller 1224 and is configured to communicate with the controller 1224. The controller 1224 is configured to control the FOD circuit 1228. The FOD circuit 1228 may be coupled to one or more sensor circuits (not shown), such as FOD sense coils of the FOD loop array 310 of FIG. 3 or sense loops 402, 604, and 606 of FIGS. 4 and 6, which may detect a foreign object within the magnetic field of the electromagnetic field 1220, such as a metal object, the electric vehicle 102, the active beacon 118, or the passive beacon 120 of FIG. 1, as described above. In aspects, each sense coil is configured to transmit a detection signal indicative of detecting the foreign object within its sensing area. The FOD circuit 1228 then communicates the detection signals to the controller 1224, which is configured to determine a position of the foreign object relative to one or more of the FOD sense coils based on the detection signals.

The receiver 1204 may include receive circuitry 1230 having a front-end circuit 1232 and a rectifier circuit 1234. The front-end circuit 1232 may include matching circuitry configured to match the impedance of the receive circuitry 1230 to the impedance of a power receiving element 1236 (e.g., vehicle IPT coil 306). The front-end circuit 1232 may further include a tuning circuit to create a resonant circuit with the power receiving element 1236. The rectifier circuit 1234 may generate a DC power output from an alternating current (AC) power input to charge the battery 1222 or provide power to some other load. The receiver 1204 and the transmitter 1202 may additionally communicate on a separate communication channel 1238, e.g., Wifi, or Bluetooth™. The receiver 1204 and the transmitter 1202 may alternatively communicate via in-band signaling using characteristics of the electromagnetic field 1220.

Further, the receiver 1204 may be configured to determine whether an amount of power transmitted by the transmitter 1202 and received by the receiver 1204 is appropriate for charging the battery 1222 or powering a load. In certain embodiments, the transmitter 1202 may be configured to generate a predominantly non-radiative field with a high coupling coefficient (k) for providing energy transfer. The receiver 1204 may directly couple to the electromagnetic field 1220 and may generate an output power for storing or consumption by the battery 1222 (or load), coupled to the output of the receive circuitry 1230.

The receiver 1204 may further include a controller 1240 configured similarly to the transmit controller 1224 as described above for one or more wireless-power management aspects of the receiver 1204. The receiver 1204 may further include a memory 1242 configured to store data, such as instructions for causing the controller 1240 to perform particular functions, such as those related to an extended-range positioning system based on foreign-object detection. The transmitter 1202 and receiver 1204 may be separated by a distance and configured according to a mutual resonant relationship to minimize transmission losses between the transmitter 1202 and the receiver 1204.

The power transmitting element 1216 and the power receiving element 1236 may correspond to or be included as part of, respectively, the transmitter 104, the base power-transfer apparatus 110, and/or the vehicle power-transfer apparatus 114 that utilize techniques for an extended-range positioning system based on foreign-object detection described herein.

The receiver 1204 may also include a beacon circuit 1244 (e.g., active-beacon transmitter circuits illustrated in example implementations 700, 800, and 900) coupled to the controller 1240 and to one or more antenna circuits (not shown). The controller 1240 is configured to control the beacon circuit 1244. The beacon circuit 1244 is configured to control the one or more antenna circuits, which may be referred to or configured as beacon loop antennas, such as the passive beacon 120 of FIG. 1. The beacon circuit 1244 may be integrated into the power receiving element 1236, or any other region of the electric vehicle 102 or the components thereof.

In an exemplary implementation, the controller 1240 is configured to control the beacon circuit 1244 by sending control signals to the beacon circuit 1244. The beacon circuit 1244 is configured to change electrical characteristics of the beacon loop antenna in response to the controller's 1240 control signals. For example, the beacon circuit 1244 can modulate, vary, or modify one or more electrical characteristics of the beacon antenna in response to the controller's 1240 control signals. In aspects, the beacon circuit 1244 can impart a distinctive modulation onto the electrical characteristic of the passive beacon 120, and the distinct modulation pattern may be used by the FOD circuit 1228 and controller 1224 to uniquely identify the passive beacon 120 from another foreign object, as described above. In at least some aspects, the beacon circuit 1244 can inject an electric current into an IPT coil (e.g., the vehicle IPT coil 306 or another IPT coil on the electric vehicle 102) to cause the IPT coil to act as a beacon transmission antenna, which can be detected by the FOD circuit 1228 in the transmitter 1202 and used to obtain positioning information of the IPT coil.

The various illustrative logical blocks, modules, circuits, and method steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the described aspects.

The various illustrative blocks, modules, and circuits described in connection with the aspects disclosed herein may be implemented or performed with a general purpose hardware processor, a Digital Signal Processor (DSP), an Application-Specific Integrated Circuit (ASIC), a Field Programmable Gate Array (FPGA) or other programmable logic device, discrete gate or transistor logic, discrete hardware components, or any combination thereof designed to perform the functions described herein. A general purpose hardware processor may be a microprocessor, but in the alternative, the hardware processor may be any conventional processor, controller, microcontroller, or state machine. A hardware processor may also be implemented as a combination of computing devices, e.g., a combination of a DSP and a microprocessor, a plurality of microprocessors, one or more microprocessors in conjunction with a DSP core, or any other such configuration.

The steps of a method and functions described in connection with the aspects disclosed herein may be embodied directly in hardware, in a software module executed by a hardware processor, or in a combination of the two. If implemented in software, the functions may be stored on or transmitted as one or more instructions or code on a tangible, non-transitory, computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the hardware processor such that the hardware processor can read information from, and write information to, the storage medium. In the alternative, the storage medium may be integral to the hardware processor. Disk and disc, as used herein, includes compact disc (CD), laser disc, optical disc, digital versatile disc (DVD), floppy disk and Blu-Ray™ disc where disks usually reproduce data magnetically, while discs reproduce data optically with lasers. Combinations of the above should also be included within the scope of computer-readable media. The hardware processor and the storage medium may reside in an ASIC.

Although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. A wireless power transmitter apparatus comprising:
   a wireless power transmit coil configured to generate a magnetic field based on an electric current running through the wireless power transmit coil for transferring power to a wireless power receiver device; and
   a detection system including a plurality of sense loops, the detection system including:
      passive-beacon position detection circuitry configured to sense and process a modulation pattern in at least one electrical characteristic of four or more of the plurality of sense loops and provide first positioning information; and
      active-beacon position detection circuitry configured to sense and process induced voltage in two or more of the plurality of sense loops to provide second positioning information.

2. The wireless power transmitter apparatus as described in claim 1, wherein the detection system is configured to provide the first positioning information and the second positioning information to a system that provides feedback to a driver of a vehicle or autonomous driving system to enable the driver or autonomous driving system to correctly align the vehicle relative to a target position defined by the wireless power transmitter apparatus.

3. The wireless power transmitter apparatus as described in claim 1, wherein:
   the first positioning information corresponds to a first position of a passive-beacon loop relative to a second position defined by the four or more of the plurality of sense loops when the passive-beacon loop is located above at least one of the four or more sense loops; and
   the second positioning information corresponds to a third position of an active-beacon transmit coil relative to a fourth position defined by the two or more of the plurality of sense loops when the active-beacon transmit coil is located in an approach sector, the approach sector comprising an area proximate to and outside of an area defined by the plurality of sense loops.

4. The wireless power transmitter apparatus as described in claim 3, wherein the second positioning information includes at least one of an estimated distance from the active-beacon transmit coil to a target position defined by the two or more of the plurality of sense loops and an estimate of a lateral offset of the active-beacon transmit coil from a centerline defined by the two or more sense loops.

5. The wireless power transmitter apparatus as described in claim 1, further comprising ferrite configured to channel magnetic flux of the magnetic field, the at least two sense loops each disposed proximate to the wireless power transmit coil on a side of the wireless power transmit coil opposite to the ferrite.

6. The wireless power transmitter apparatus as described in claim 5, wherein each of the two or more of the plurality of sense loops defines a planar area that is smaller than an area of a surface of the ferrite.

7. The wireless power transmitter apparatus as described in claim 6, wherein the plurality of sense loops forms a substantially planar rectangular array and wherein the two or more sense loops are each disposed proximate to a corner of the rectangular array.

8. The wireless power transmitter apparatus as described in claim 1, wherein the second positioning information is based on at least one of a passive beacon loop and an active-beacon transmit coil integrated in the wireless power receiver device.

9. The wireless power transmitter apparatus as described in claim 1, wherein the detection system further comprises a controller configured to:
   use the second positioning information until the modulation pattern in the at least one electrical characteristic is detected in at least one of the four or more sense loops; and
   when the modulation pattern is detected, switch to using the first positioning information obtained from the passive-beacon position detection circuitry.

10. The wireless power transmitter apparatus as described in claim 1, wherein:
   the four or more of the plurality of sense loops are selectively electrically coupled to a first processing circuit configured to process the modulation pattern in the at least one electrical characteristic of each of the four or more sense loops to provide the first positioning information; and the two or more of the plurality of sense loops are selectively electrically connected to a second processing circuit configured to process induced voltage in each of the two or more sense loops to provide the second positioning information.

11. The wireless power transmitter apparatus as described in claim 1, wherein the plurality of sense loops are distributed over an area spanning at least the wireless power transmit coil.

12. The wireless power transmitter apparatus as described in claim 1, wherein the detection system includes foreign object detection circuitry configured to detect metal objects within the magnetic field generated by the wireless power transmit coil based on changes in at least one electrical characteristic of one or more of the plurality of sense loops.

13. A wireless power receiver apparatus, comprising:
a wireless power receive coil;
a passive-beacon circuit comprising a passive-beacon loop and a passive-beacon modulator circuit configured to generate a modulation, based on a modulated impedance state of the passive-beacon modulator circuit, that is detectable by a detection system including one or more sense loops at a wireless power transmitter apparatus for determining first positioning information of the passive-beacon loop relative to the one or more sense loops; and
an active-beacon transmitter circuit comprising a signal generator circuit and a dedicated active-beacon transmit coil that is different from the wireless power receive coil, the signal generator circuit configured to inject an electric current into the active-beacon transmit coil to cause the active-beacon transmit coil to generate an active-beacon magnetic field signal that is detectable by the detection system for determining second positioning information of the wireless power receive coil relative to the one or more sense loops.

14. The wireless power receiver apparatus as described in claim 13, wherein the active-beacon transmit coil, when driven by the signal generator circuit, generates a predominantly horizontally polarized magnetic field substantially parallel to a plane defined by the wireless power receive coil.

15. The wireless power receiver apparatus as described in claim 13, wherein the active-beacon transmit coil, when driven by the signal generator circuit, generates a predominantly horizontally polarized magnetic field substantially parallel to a plane defined by the wireless power receive coil, in a direction different than a field that the wireless power receive coil generates when driven by a current.

16. The wireless power receiver apparatus as described in claim 13, wherein the active-beacon transmit coil is a solenoid or a double-D coil.

17. The wireless power receiver apparatus as described in claim 13, wherein the active-beacon transmit coil is a circular coil, which when driven by the signal generator circuit, generates a magnetic field substantially orthogonal to a plane defined by the active-beacon transmit coil.

18. The wireless power receiver apparatus as described in claim 13, wherein the active-beacon transmitter circuit is configured to operate at a frequency in a range from 119 to 148.5 kHz.

19. The wireless-power receiver apparatus as described in claim 13, wherein the active-beacon magnetic field signal is modulated for transferring information.

20. A method comprising:
detecting an induced voltage in two or more sense loops of a detection system in response to a magnetic field generated by an active-beacon transmitter;
measuring a magnitude of the induced voltage at each of the two or more sense loops;
estimating a distance between an active-beacon transmit coil of the active-beacon transmitter and a target position defined by the two or more sense loops based on the induced voltage magnitudes measured at the two or more sense loops;
determining a lateral offset of the active-beacon transmit coil from a centerline defined by the two or more sense loops based on a comparison between the induced voltage magnitudes of the two or more sense loops; and
generating position information based on the estimated distance and the lateral offset, the position information usable to align a wireless power receiver device with a wireless power-transmitter apparatus for transferring power to an electric vehicle connected to the wireless power receiver device.

21. The method as described in claim 20, wherein the two or more sense loops are each disposed proximate to a corner of a rectangular array of sense loops of the detection system.

22. The method as described in claim 20, wherein:
the two or more sense loops include first and second sense loops positioned on opposing sides of a centerline defined by the first and second sense loops; and
the lateral offset is determined based on a ratio of the induced voltage magnitudes measured at the first sense loop and at the second sense loop.

23. A method of operating a wireless power receiver apparatus including a wireless power receive coil, a passive-beacon circuit comprising a passive-beacon loop and a passive-beacon modulator circuit, and an active-beacon transmitter circuit comprising a signal generator circuit and a dedicated active-beacon transmit coil that is different from the wireless power receive coil, the method comprising:
operating the passive-beacon loop to generate a modulation, based on a modulated impedance state of the passive-beacon modulator circuit, that is detectable by a detection system including one or more sense loops at a wireless power transmitter apparatus for determining first positioning information of the passive-beacon loop relative to the one or more sense loops; and
operating the signal generator circuit to inject an electric current into the active-beacon transmit coil, causing the active-beacon transmit coil to generate an active-beacon magnetic field signal that is detectable by the detection system for determining second positioning information of the wireless power receive coil relative to the one or more sense loops.

24. The method as described in claim 23, further comprising driving the active-beacon transmit coil, with the signal generator circuit, to generate a predominantly horizontally polarized magnetic field substantially parallel to a plane defined by the wireless power receive coil.

25. The method as described in claim 23, further comprising driving the active-beacon transmit coil, with the signal generator circuit, to generate a predominantly horizontally polarized magnetic field substantially parallel to a plane defined by the wireless power receive coil, in a direction different than a field that the wireless power receive coil generates when driven by a current.

26. The method as described in claim 23, further comprising operating the active-beacon transmitter circuit at a frequency in a range from 119 to 148.5 kHz.

27. The method as described in claim 23, further comprising modulating the active-beacon magnetic field signal to transfer information.

\* \* \* \* \*